(12) United States Patent
Liang et al.

(10) Patent No.: US 7,929,050 B2
(45) Date of Patent: Apr. 19, 2011

(54) DOCUMENT CAMERA

(75) Inventors: Ernie Liang, Los Angeles, CA (US);
Rajeev Mishra, Manhattan Beach, CA (US); Supina Mapon, Evanston, IL (US)

(73) Assignee: Epson America, Inc., Long Beach, CA (US)

( * ) Notice: Subject to any disclaimer, the term of this patent is extended or adjusted under 35 U.S.C. 154(b) by 929 days.

(21) Appl. No.: 11/824,293

(22) Filed: Jun. 29, 2007

(65) Prior Publication Data
US 2009/0002548 A1    Jan. 1, 2009

(51) Int. Cl.
*H04N 5/225* (2006.01)
*G03B 21/14* (2006.01)
*G03B 21/22* (2006.01)

(52) U.S. Cl. .................................. 348/373; 353/119

(58) Field of Classification Search .......... 348/373–376; 355/64, 70; 353/120; 403/50, 53, 180–181; 362/413, 418–419, 428
See application file for complete search history.

(56) References Cited

U.S. PATENT DOCUMENTS

| | | | | |
|---|---|---|---|---|
| 6,115,068 A * | 9/2000 | Ariga et al. | ................. | 348/373 |
| 2002/0094203 A1 * | 7/2002 | Tseng et al. | ................. | 396/428 |
| 2004/0233325 A1 | 11/2004 | Lee et al. | ................. | 348/375 |
| 2005/0088543 A1 | 4/2005 | Yoshii | ................. | 348/239 |
| 2005/0122488 A1 * | 6/2005 | Fernandez | ................. | 353/120 |
| 2006/0092315 A1 * | 5/2006 | Payonk et al. | ................. | 348/370 |
| 2007/0162949 A1 * | 7/2007 | Nitta et al. | ................. | 725/134 |

FOREIGN PATENT DOCUMENTS

| | | |
|---|---|---|
| EP | 1 259 059 A | 11/2002 |
| EP | 1 744 532 A | 1/2007 |
| WO | WO 2005/101349 | 10/2005 |

OTHER PUBLICATIONS

PCT International Search Report for PCT Patent Application PCT/US2008/007481, dated Aug. 21, 2008 (4 pages).

* cited by examiner

*Primary Examiner* — Kelly L Jerabek
(74) *Attorney, Agent, or Firm* — Pillsbury Winthrop Shaw Pittman LLP

(57) ABSTRACT

A document camera includes a base, a first arm, a second arm, and a camera head assembly. The base includes control electronics. The first arm is connected at a first end to a side of the base utilizing a first hinge. The second arm is connected at a first end to a second end of the first arm utilizing the second hinge. The camera head assembly is connected at a first end to a second end of the second arm utilizing the third hinge. The camera head assembly includes a lens adjuster and an imaging sensor and movement of the lens adjuster changes an orientation of the imaging sensor. The first side of the first arm is connected to a first side of the base and a second side of the first arm is connected to the second hinge.

25 Claims, 28 Drawing Sheets

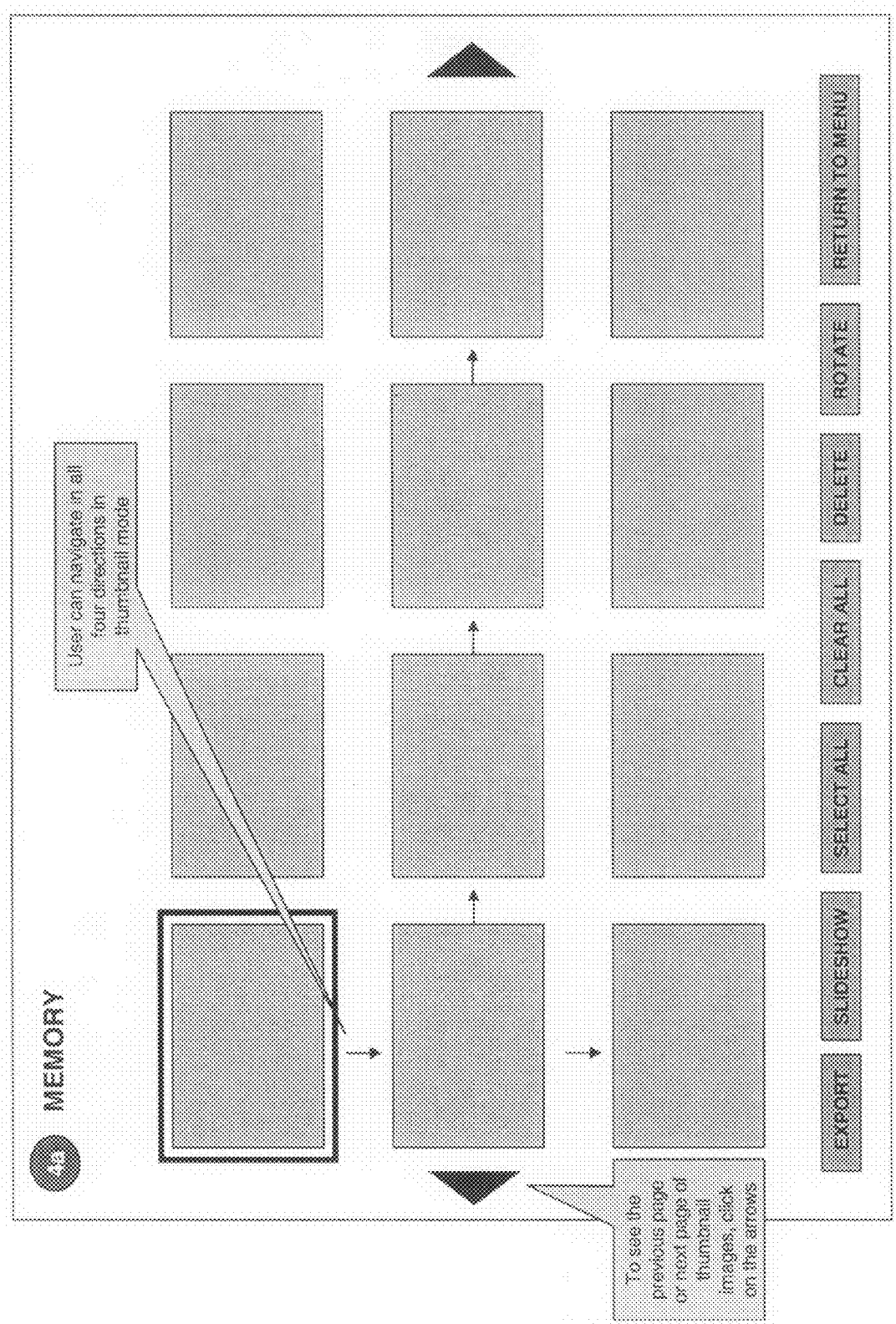

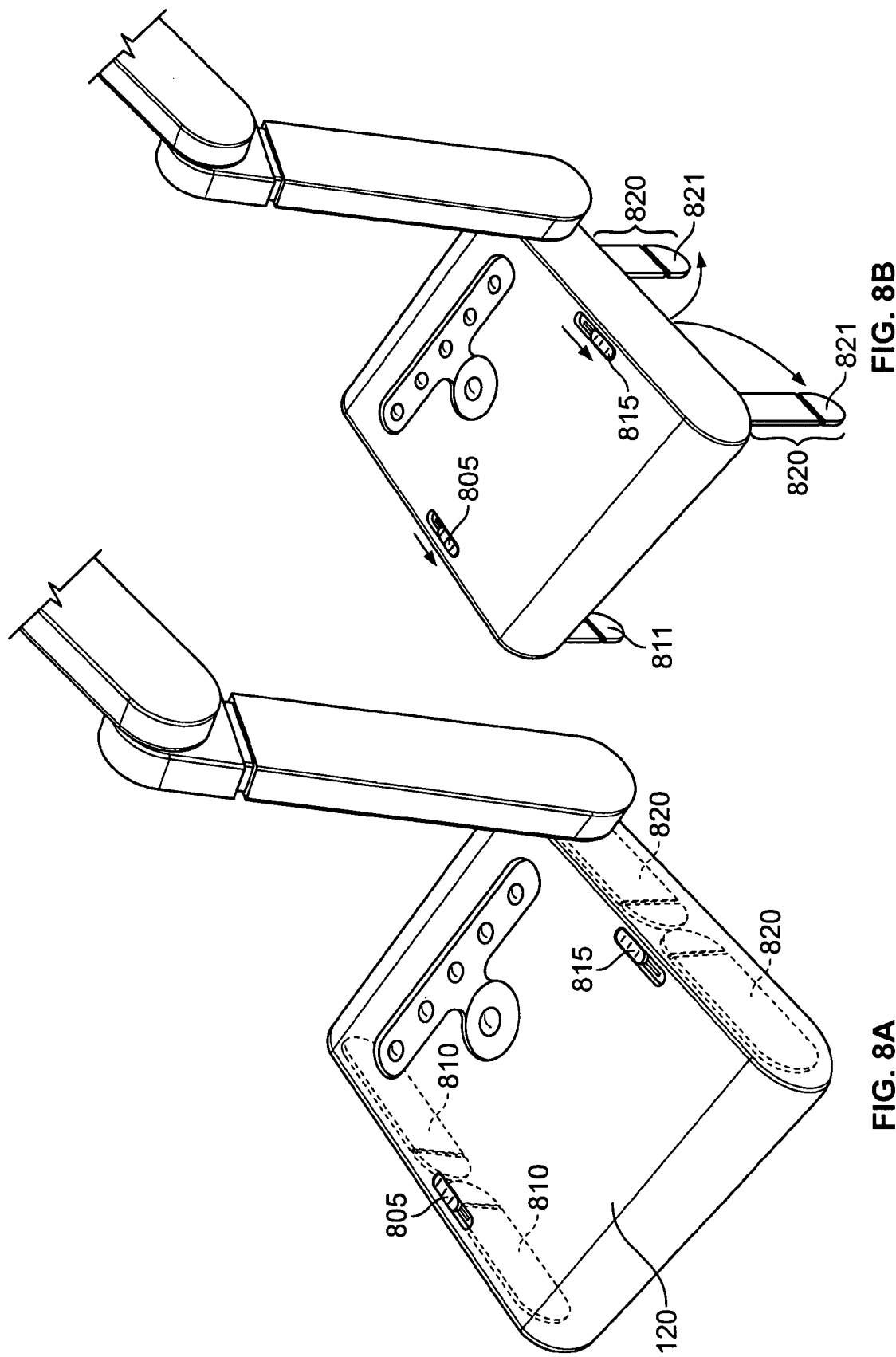

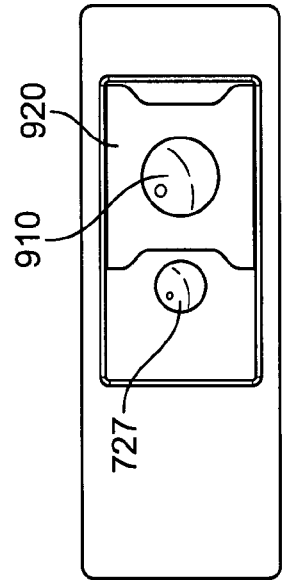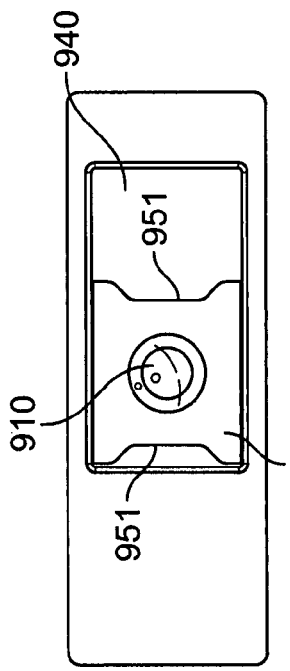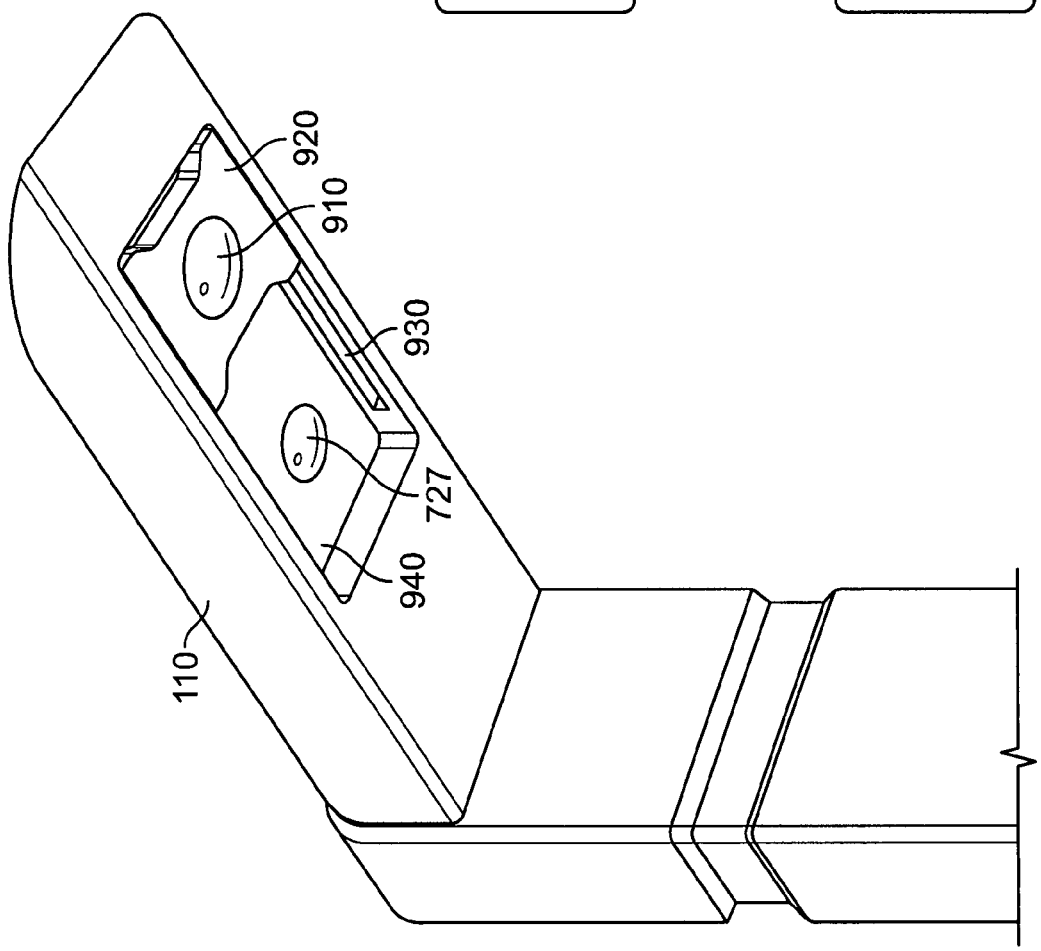

DOCUMENT CAMERA

BACKGROUND OF THE INVENTION

1. Field of the Invention

The present invention related to a document camera which takes a visual image of a material (object or document) placed on a surface where the visual image is taken with a video camera, electrically converted to a digital image, and transmitted to an external display device.

2. Description of Related Art

Over-head projectors (OHP) are most popular visual presenters used in fields such as education and legal. With significant improvement of CCD (charge coupled device) and CMOS sensors, document cameras using the CCD or CMOS sensor have been developed and proposed. In such a document camera, a visual image of a material, a sample, or another subject matter placed on a table is taken with a CCD (or CMOS sensor) located above the table. The visual image is output as video signals to a display device, i.e., a computer monitor or a projector, etc.

A number of document camera are available in the market. However, many of the document cameras cannot capture a larger viewing area, e.g., an area greater than 8.5" by 11." A large number of the document cameras cannot be folded into a convenient storage position.

In addition, document camera cannot receive wireless video input from an external device. Document cameras also do not have features that allow the reception of a television signal as an input signal. In addition, the document camera does not have capabilities of operating like a digital video recorder.

BRIEF DESCRIPTION OF THE DRAWINGS

FIG. 7E illustrates a memory menu according to an embodiment of the present invention;

FIG. 8A a side view of a document camera including extendable legs to add additional height to the document camera;

FIG. 8B illustrates a document camera including extendable legs to add additional height to the document camera;

FIGS. 9A, 9B, and 9C illustrate use of a macro lens which slides over a document camera lens according to an embodiment of the present invention;

FIG. 12A includes a VGA output cable in a retracted position and FIG. 12B includes a VGA output cable in an extended position;

DETAILED DESCRIPTION OF THE INVENTION

Figure 1:
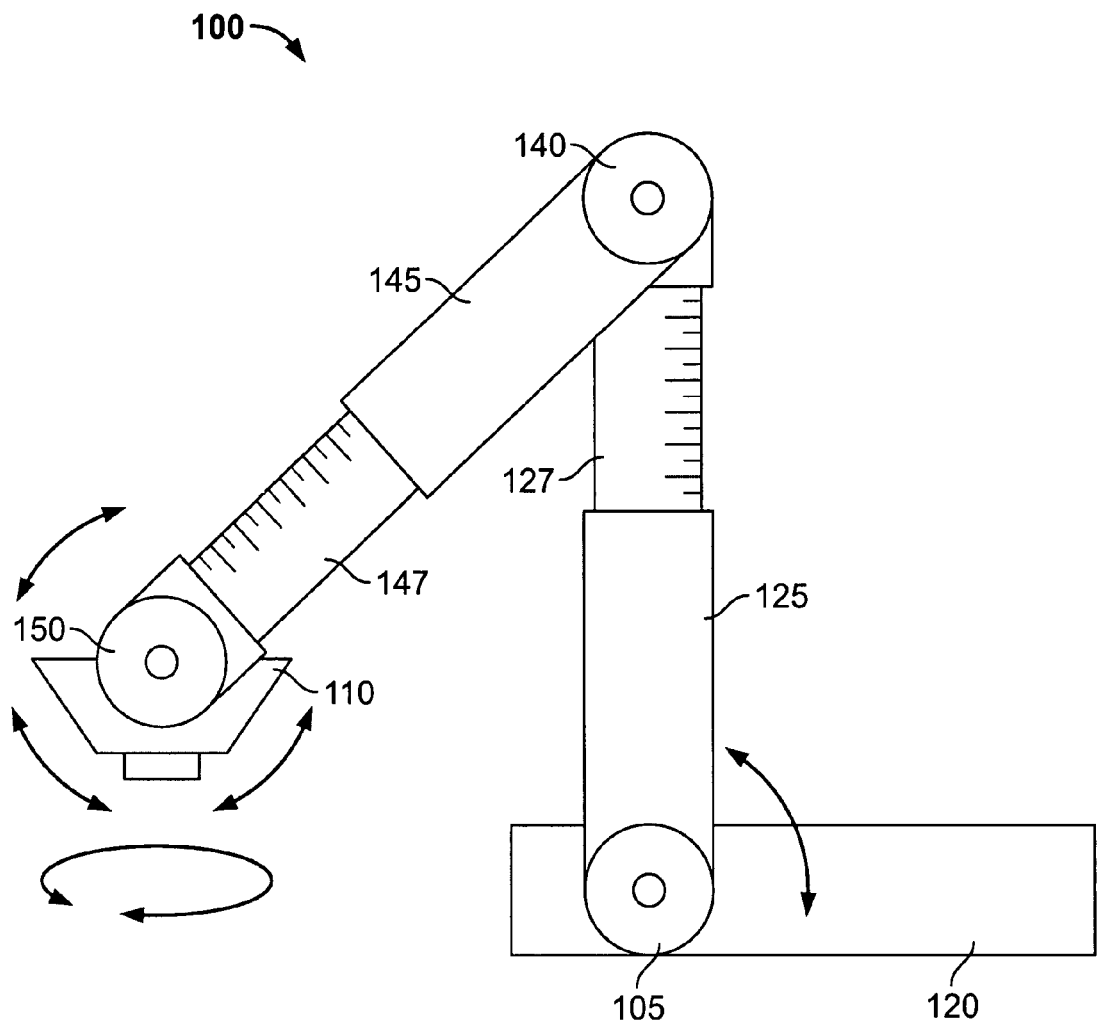
FIG. 1 illustrates a side view of 4 axis/2 telescoping arm document camera according to an embodiment of the invention.

In this application, the camera which captures images is referred to as a document camera. The camera may also be referred to as a document imager, a visualizer, a document visualizer, a visual presenter, DOAR presenter, an object display camera, and a portable image input device. FIG. 1 illustrates a side view of 4 axis/2 telescoping arm document camera according to an embodiment of the invention. The document image camera 100 includes a base 120, a camera head assembly 110, a first hinge 105, a first arm 125, and a second arm 145. The first arm 125 is connected to a base 120 on a side surface of the base 120 via a first hinge 105. The first arm 125 is connected to the second arm 145 via a second hinge 140. The second arm 145 is connected to the camera head assembly 110 via a third hinge 150.

In an embodiment of the invention, the first hinge 105 may have an axis of rotation of 90 degrees. In an embodiment of the invention, the second hinge 145 may have an axis of rotation of 180 degrees. In an embodiment of the invention, the third hinge 150 may have an axis of rotation of 270 or 360 degrees.

In an embodiment of the invention, the first hinge 105 may have an axis of rotation of up to 270 degrees. In an embodiment of the invention, the second hinge 140 may have an axis of rotation of up to 360 degrees. In an embodiment of the invention, the third hinge 150 may have an axis of rotation of up to 270 degrees.

Figure 2A:
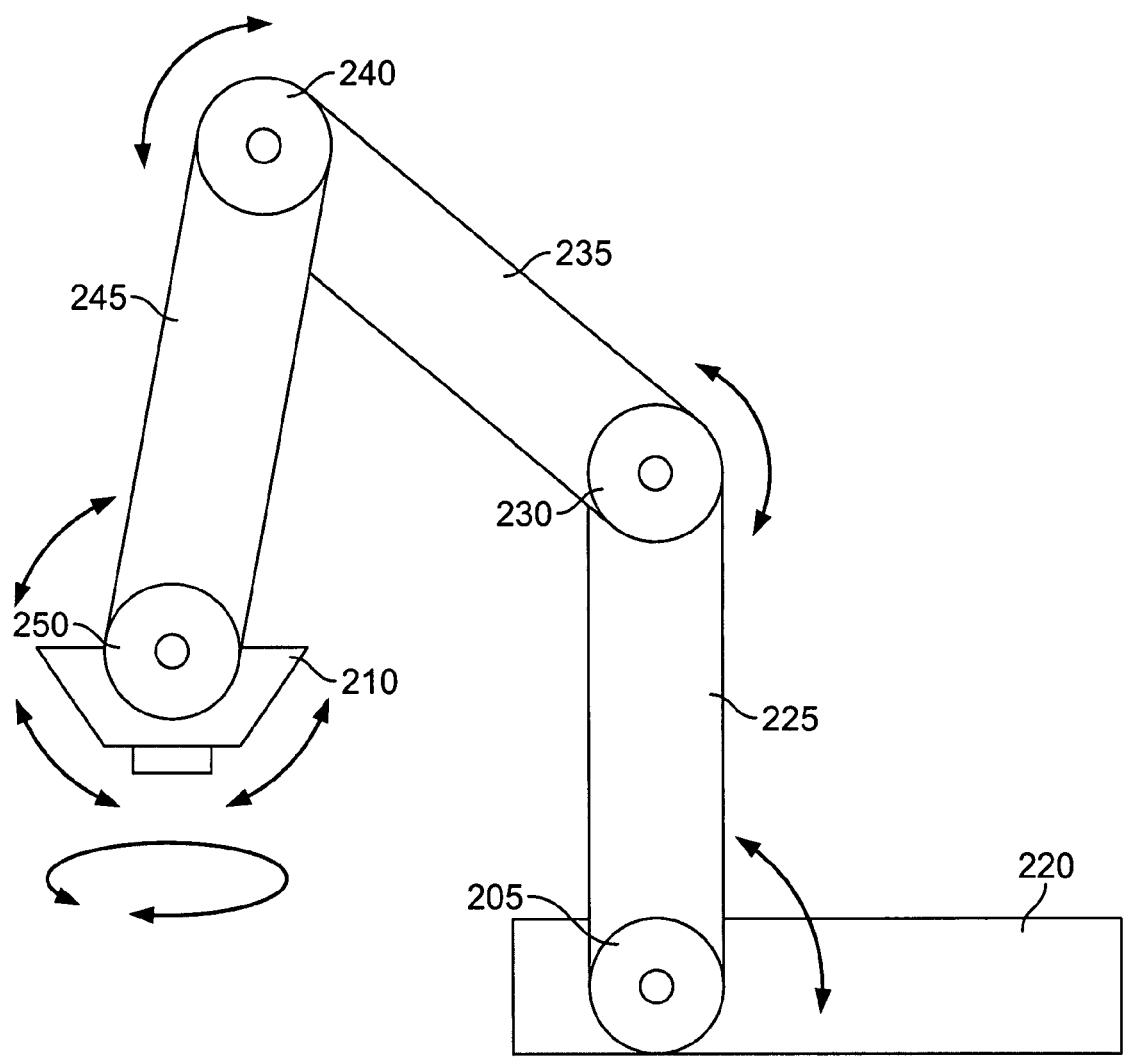
FIG. 2A illustrates a 4 axis/3 arm document camera according to an embodiment of the invention.

FIG. 2A illustrates a 4 axis/3 arm document camera according to an embodiment of the invention. The document image camera includes a base 220, a camera head assembly 210, a first hinge 205, a first arm 225, a second hinge 230, a second arm 235, a third hinge 240, a third arm 245, a fourth hinge 250, and a camera head assembly 210. The base 220 is connected to the first arm 225 via a first hinge 205. The first arm 225 is connected to a second arm 235 via a second hinge 230. The second arm 235 is connected to a third arm 245 via a third hinge 240. The third arm 245 is connected to the camera head assembly 210 via a fourth hinge 250.

In an embodiment of the invention, the first hinge 205 has an axis of rotation of 90 degrees. The second hinge 230 has a rotation axis of 180 degrees. The third hinge 240 has a rotation axis of 180 degrees. The fourth hinge 250 has an axis of rotation of approximately 270 degrees.

Figure 2B:
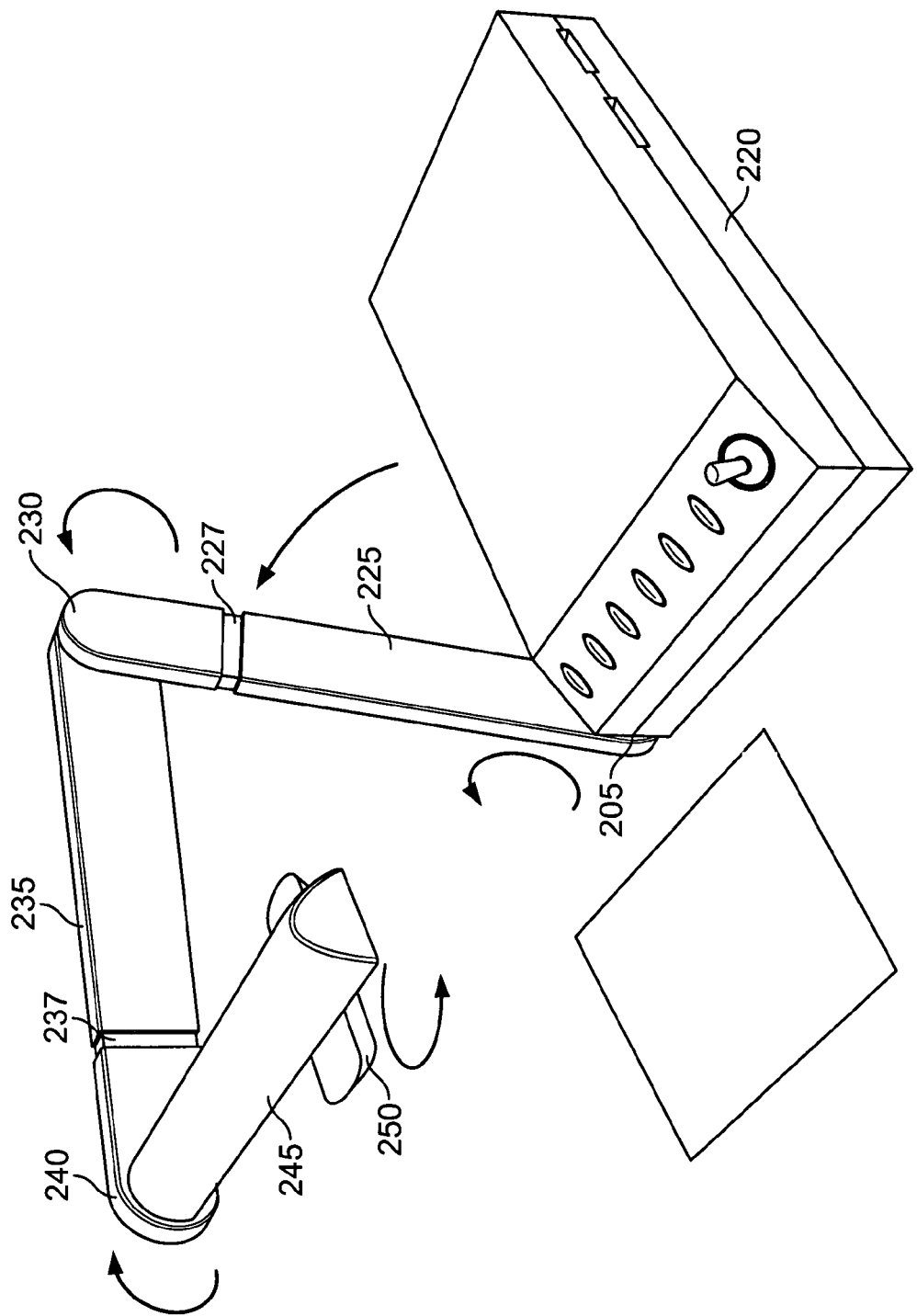
FIG. 2B illustrates another embodiment of a 3 axis/3 arm document camera according to an embodiment of the present invention.

FIG. 2B illustrates another embodiment of a 3 axis/3 arm document camera according to an embodiment of the present invention. The portable document camera includes a base 220, a first hinge 205, a first arm 225, a first telescoping portion 227, a second hinge 230, a second arm 235, a second telescoping portion 237, a third hinge 240, a third arm 245, and a camera head assembly 250. The first arm 225 is connected to the base via a first hinge. In an embodiment of the invention, the first arm 225 rotates in a counterclockwise direction from a base 220. The first arm 225 includes a telescoping portion 227. The end of the first arm 225 including the telescoping portion 227 is attached to the second arm 235 via a second hinge 230. The second arm 235 includes a telescoping portion 237. The end of the second arm 235 includes including the telescoping portion 237 is attached to a third arm 245 via a third hinge 240. The third arm 245 includes a camera head assembly 250. In the embodiment of the invention illustrated in FIG. 2B, the camera head assembly 250 rotates in a counterclockwise direction. The camera head assembly 250 may also rotate in a clockwise direction.

Figure 2C:
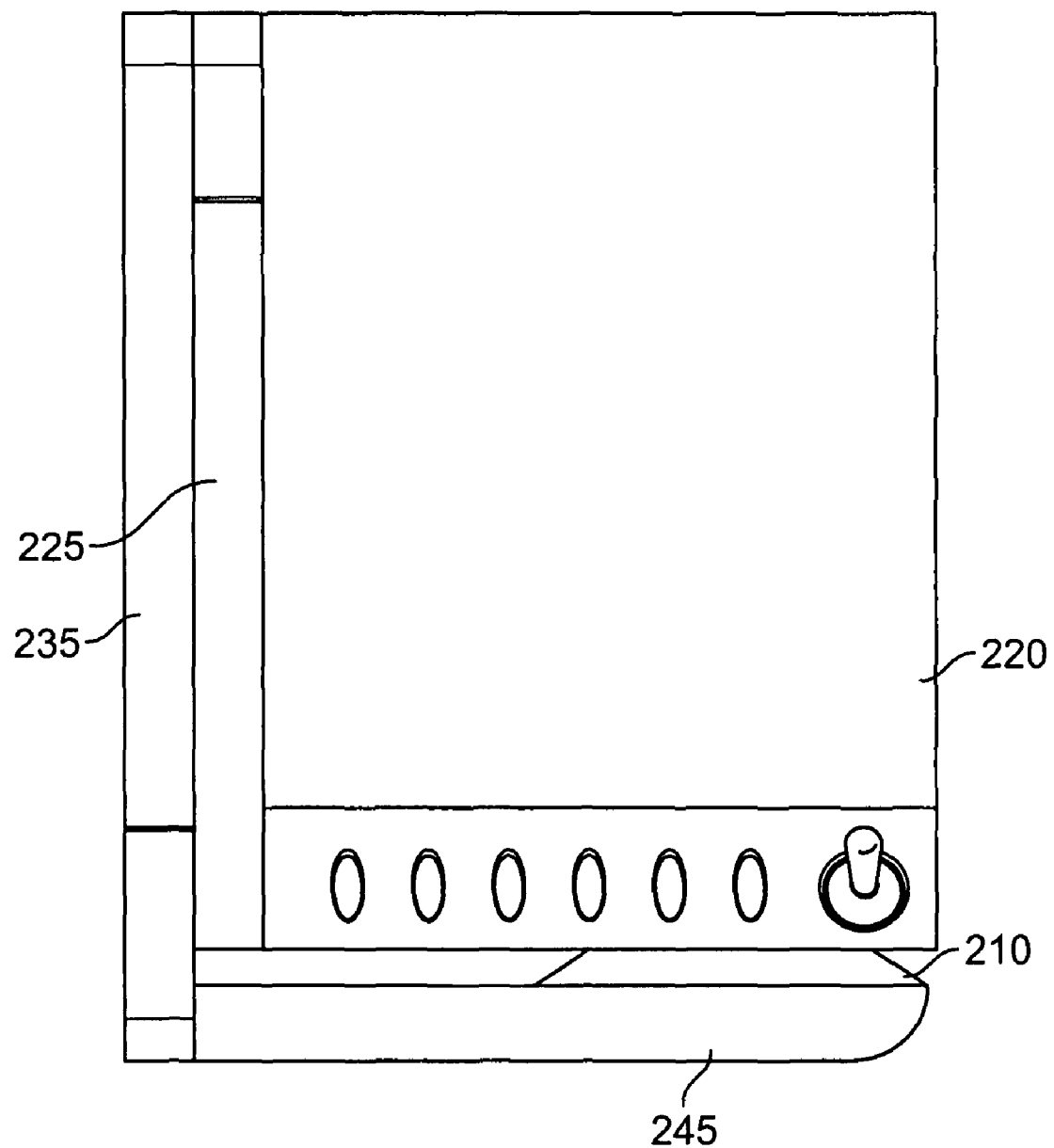
FIG. 2C illustrates the document camera of FIG. 2B in a storage mode according to an embodiment of the invention.

FIG. 2C illustrates the document camera of FIG. 2B in a storage mode according to an embodiment of the invention. In this storage mode, the first arm 225 lies parallel (or alongside) a first side of the base 220. The second arm 235 lies alongside (or parallel) to the first arm 235 and also the first side of the base 220. The third arm 245 lies alongside (or parallel) to a second face of the base 220. The third arm 245 is positioned at a 90 degree angle to the first arm 225 and the second arm 235.

Figure 3A:
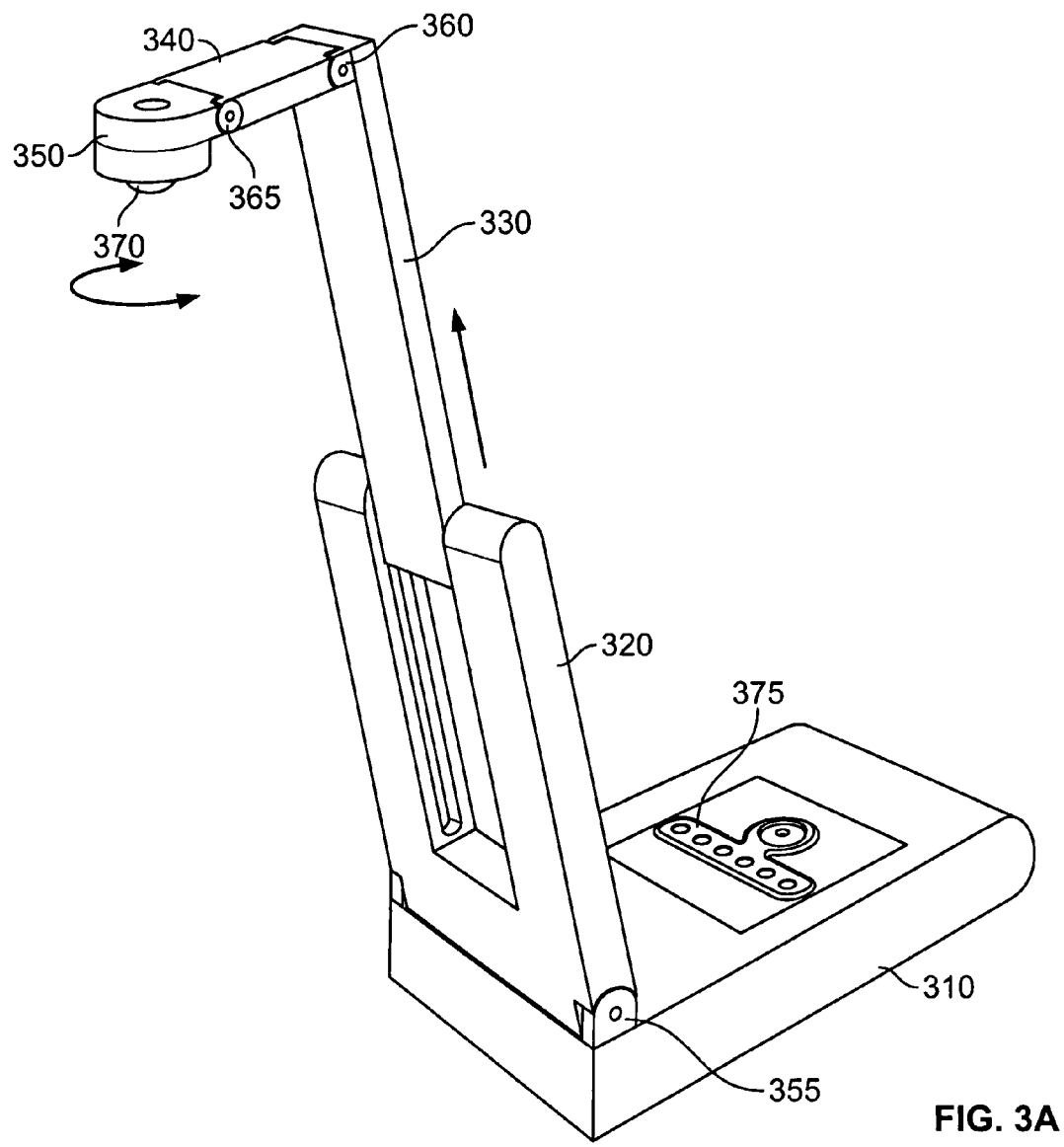
FIG. 3A illustrates an embodiment of a document camera according to an embodiment of the invention.
Figure 3B:
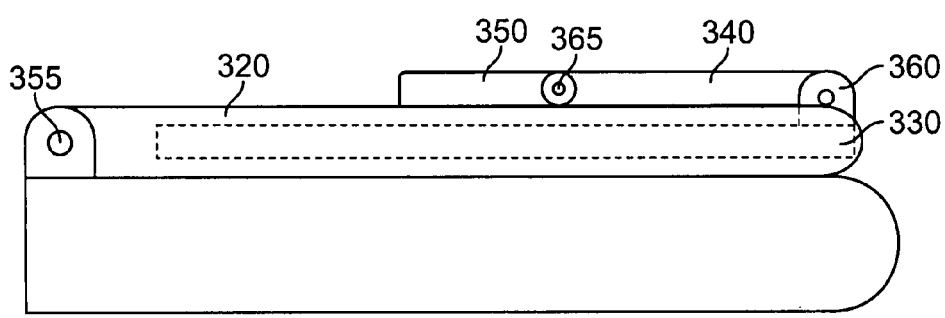
FIG. 3B illustrates a folded side view of the document camera illustrated in FIG. 3A according to an embodiment of the invention.

FIG. 3A illustrates an embodiment of a document camera according to an embodiment of the invention. The portable document image capture includes a base 310, a first U-shaped arm 320, a second arm 330, a third arm 340, and a document camera assembly 350. The first U-shaped arm 320 is a connected to the base via a pivot 355. In an embodiment of the invention, the pivot 355 has a range of greater than 180 degrees. The second arm 330 may fit into the hole of the first arm 320 as is illustrated in FIG. 3A. The second arm 330 is extendable from a bottom of the hole formed by the first U-shaped arm 320 to a top portion of the first U-shaped arm 320. The second arm 330 is connected to the third arm 340 via a second pivot 360. In an embodiment of the invention, the range of operation of a third arm 340 in relation to the second arm 330 is approximately 360 degrees. In other words the pivot 360 may have a range of operation of approximately 360 degrees. The third arm 340 is connected to the camera assembly 350 via a third pivot 365. In an embodiment of the invention, the third pivot 365 may have a range of operation of approximately 360 degrees. The document camera assembly 350 includes a rotating camera head 370. The rotating camera head 370 may rotate approximately 360 degrees. As is illustrated in FIG. 3A, a control panel 375 may be located on a top surface of the base 310. FIG. 3B illustrates a folded side view of the document camera illustrated in FIG. 3A according to an embodiment of the invention. FIG. 3B shows that the second arm 330 slides into the U-shaped opening of the first arm 320. The first arm 320 rotates on the first pivot 355 in a clockwise direction so that the first arm 320/second arm 330 rest on top of a face of the base 310. The third arm 340 rotates on the second pivot 360 (in a counterclockwise direction) and lies on the first arm 320/second arm 330, as is illustrated in FIG. 3B.

Figure 4:
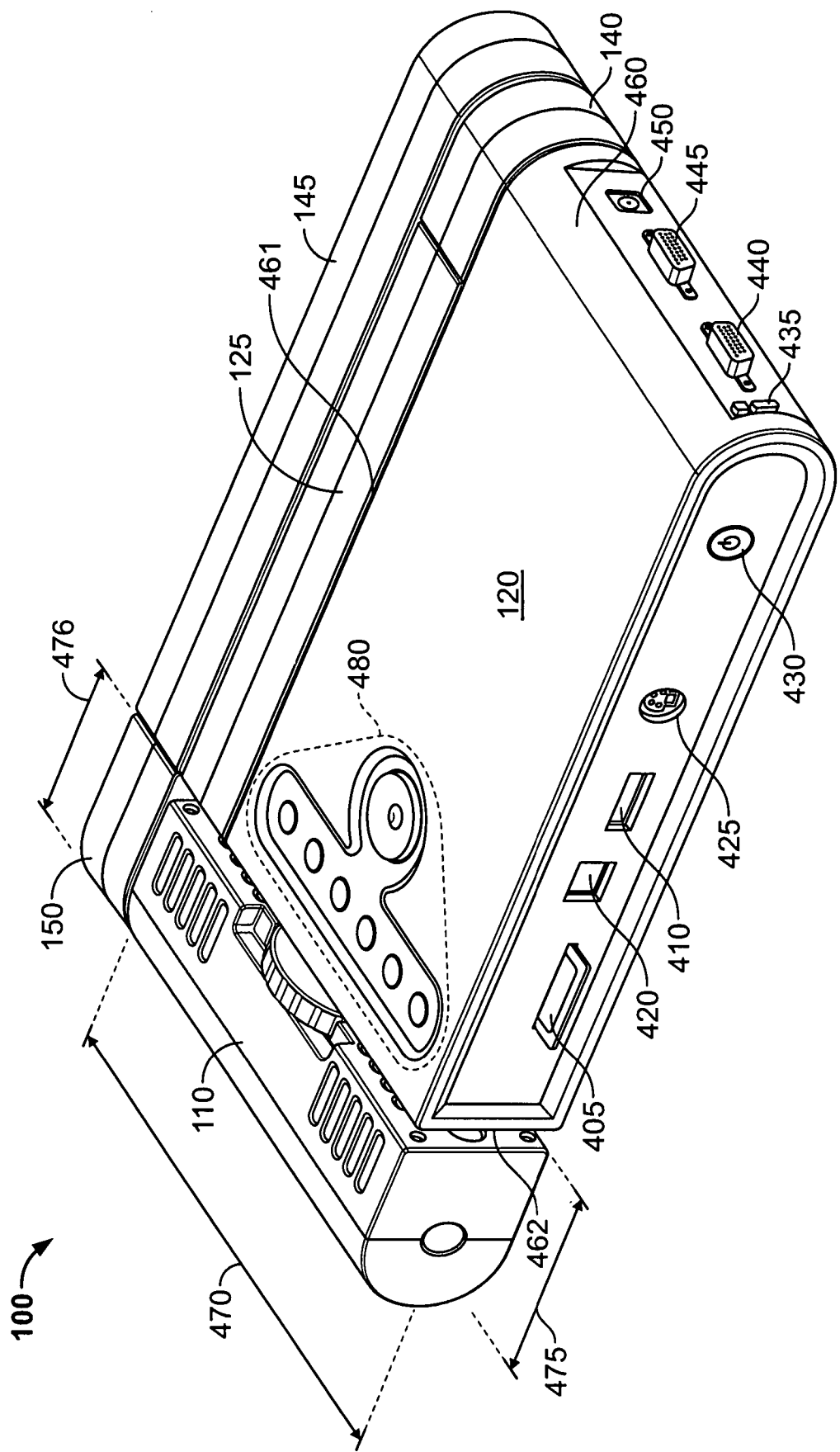
FIG. 4 illustrates a top perspective view of the document camera including input connections and output connections according to an embodiment of the invention.

FIG. 4 illustrates a top perspective view of the document camera including input connections and output connections according to an embodiment of the invention. The base 120 includes input ports for a number of different input media. In the embodiment of the invention, the base 120 includes a memory card input port 405. Illustratively, this may be a Memory Stick, a SD card, a Multi-Media Card (MMC) memory card, a Compact Flash (CF) card, or a XD memory card.

In an embodiment of the invention, the base 120 may include a Universal Serial Bus (USB) port 410. The USB port 410 may only be an input port to receive data. The USB port may be a bi-directional port to both transmit and receive data. FIG. 4 illustrates that the USB port 410 is a USB Type A receptacle. The base may also include a second USB receptacle 420. The second USB port 420 may only be an input port to receive data, or alternatively may be a bidirectional port to both transmit and receive data. FIG. 4 illustrates that the USB port 420 is a USB Type B connector. In embodiments of the invention, the base 120 may only include one of the USB Type A input receptacle and the B type input receptacle. In embodiments of the invention, the USB receptacle may be mini-USB Type A receptacle, a mini-USB Type B receptacle, a Micro Type A receptacle, a Micro Type B receptacle, or a Micro TypeAB receptacle.

The base may also include a S-video input and output connector 425. The S-video input and output connector 425 receives S-video input from an outside source which is able to be stored in memory. The S-video connector may also only be utilized for one of input or output. In an embodiment of the invention, the base 120 may include a composite video input or output connector. The connector may receive composite video in the format of an analog television (picture only) signal. The composite video may be in a standard format, e.g., NTSC, PAL, or SECAM. The base 120 includes a power on/power off button 430.

In an embodiment of the invention, the base 120 may include a RGB input or output connector. The connector may receive RGB input from a monitor or computer display. The base 120 may also include an additional RGB output connector for driving two monitors and the same time. In an embodiment of the invention, the base 120 may include a VGA output connector 440 and a VGA input connector 445. There may also be an additional VGA output connector (not shown). This allows for the VGA output signal to be transmitted to a second monitor at the same time as being transmitted to a projector or a computer display. In an embodiment of the invention, the base 120 may also include a VGA connector 440, which may be utilize for input and/or output. In an embodiment of the invention, the VGA input connector 445 may receives VGA input from a device, e.g., a monitor, and the base 120 may pass this video through to the VGA output connector 440. The base also includes a DC power connector 450. A power cord with transformer connects the DC power connector 450 to an AC power source, e.g., a AC mains wall socket. In an embodiment of the invention, the base 120 may also include a Kensington lock slot (or security slot) 435 to which a Kensington lock can be attached. Because of the markets for the document camera is the education market (e.g., elementary, junior high, and secondary education) and the legal market (e.g., courtrooms), it is important to have a lock to prevent the document cameras from being removed from a classroom or a courtroom.

FIG. 4 also illustrates the compact and sleek design of the document camera when the document camera is in a storage or carrying position. One face 460 of the base 120 is curved. In an embodiment of the invention, the curvature is semi-circular. Illustratively, this may be the face that includes the video output connector 440 and the video input connector 445. When the document camera is in a storage position, the first arm 125 lies flush alongside a second face 461 of the base 120. In an embodiment of the invention, the second face 461 is at a right angle to the first face 460. In embodiments of the invention, the first arm's 125 height from the ground, when the first arm 125 is in resting position, has a height that is less than or equal to the height, from the ground, of the base 120. The second hinge 140 is curved at one end and the curvature is substantially similar to the curvature of the first face 460 of the base 120 of the document camera. In other words, if the document camera were viewed from a side view opposite where the first arm 125 is resting, a viewer would see the first arm 125 or second hinge 140 does not rise above the height of the base because 1) the curvature of the first face 460 of the base 120 would be similar or larger than the curvature of the second hinge 140 and 2) height of the first arm 125 is similar or smaller than the height of the base 120.

In an embodiment of the invention, the length of the hinge 140 and the first arm 125 may be equal to or within two to three inches of the length of the base 120. The second arm 145 (as noted before) is connected to the first arm 125 via the second hinge 140. The second arm 145 lies next to the first arm 125. The second arm 145 has a height that is less than or equal to the first arm 125 and also the base 120. When viewing the document camera from a side opposite where the first arm 125 and the second arm 145 are resting, a viewer would see that the height of second arm 145 (in the resting or storage position) may not be larger than the height of the base 120 because the height may be the same or smaller than the height of the base 120. In addition, in an embodiment of the invention, a length of the second arm 145 is equal to or within two to three inches of the base 120.

The second arm 145 is connected to the camera head assembly 110 by the third hinge 150. In an embodiment of the invention, the third hinge 150 is at a second end of the second arm 145. The width of the second hinge 150 may be equal or substantially similar to a width of the second arm 145. This appears to make the second hinge 150 an extension of the second arm. In the closed (or rest position), the camera head assembly 110 lies next to a third face 462 of the base 120. In an embodiment of the invention, the length of the camera head assembly (illustrated as reference number 470) is equal or close to equal to the width of the base 120 added to the width of the first arm 125. In an embodiment of the invention, the height of the camera head assembly 110 (illustrated by reference number 475) is equal or substantially similar to the length (illustrated by reference number 476) of the third hinge 150. Both a top surface of the camera head assembly 110 and a face of the third hinge 150 are curved. As illustrated in FIG. 4, the curvature may be semi-circular. This provides the portable document imager with a curved face on two sides. The dimensions of the base 120, the first arm 125, the second hinge 140, the second arm 145, the third hinge 150, and the camera head assembly 110 result in the portable document image having a rectangular footprint when viewing the document imager from above. The portable document imager also includes a control panel 480.

The compact design of the document camera results in a small footprint. In an embodiment of the invention, the document camera may have a length of less than 11 inches, a width of less than 6 inches, and has a height of less than 2 inches. In an embodiment of the invention, the base 120 may have length of 8.81 inches and a width of 5.59 inches. In an embodiment of the invention, when the first arm 125 and the second arm 145 are extended to a fully extended position (by extending the telescoping portions of both arms), the camera head assembly 110 may be a position that is approximately 25 inches above a horizontal surface. In an embodiment of the invention, the first arm 125 may have a telescoping portion 127 with a length of 3¾ inches. The second arm 145 may have a telescoping portion 147 with a length of 3¾ inches.

Figure 5A:
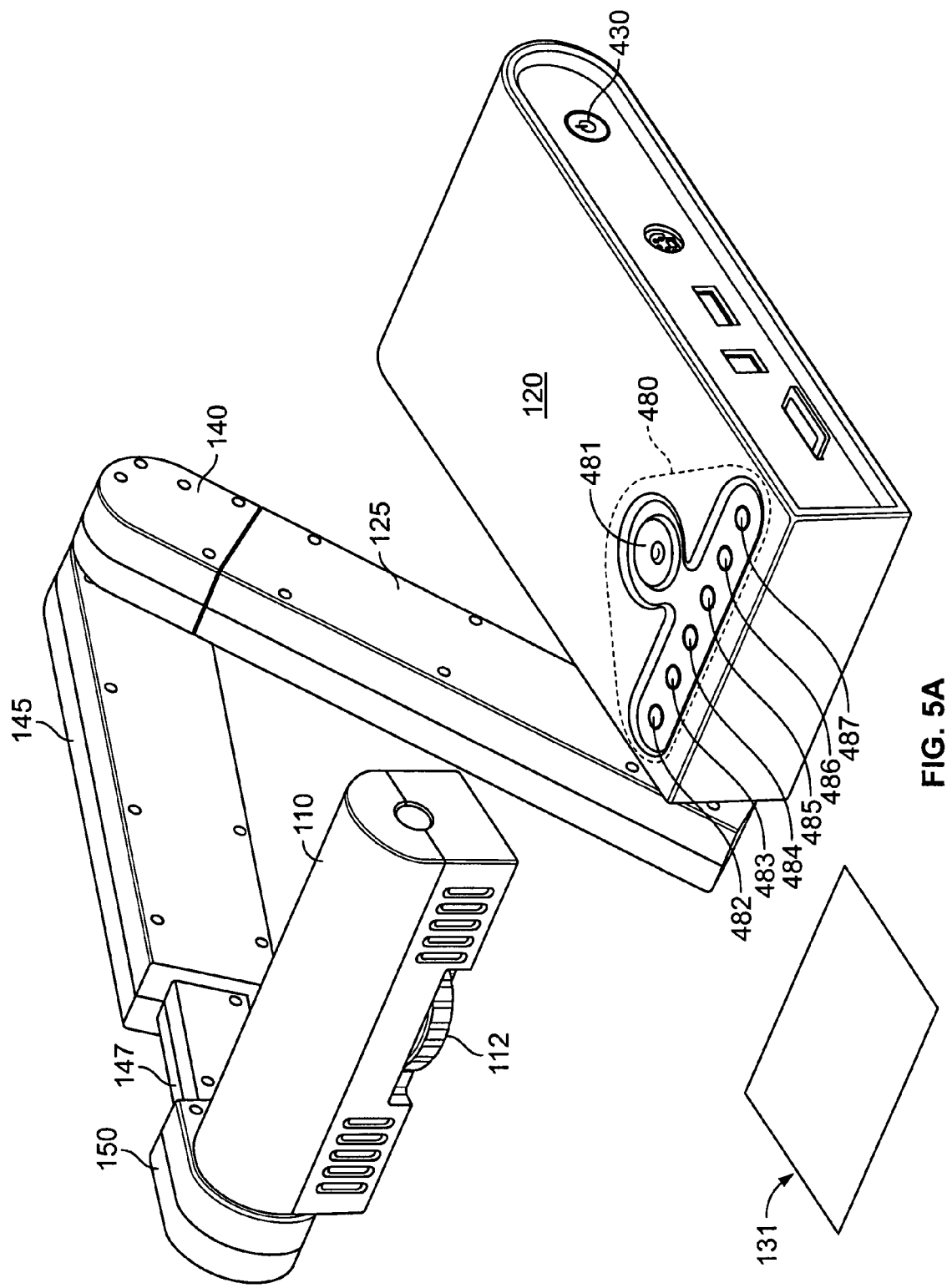
FIG. 5A illustrates a document camera in an elevated position to capture documents placed in front of a base of the portable document imager according to an embodiment of the invention.

FIG. 5A illustrates a document camera in an elevated position to capture documents placed in front of a base of the document camera according to an embodiment of the invention. As illustrated in FIG. 5A, the first arm 125 is raised from a surface on which the base 120 lies at approximately a 45 degree angle. In the embodiment of the invention illustrated in FIG. 5A, the first arm 125 is rotated in a counterclockwise direction from its resting position. In other words, the first arm 125 has been rotated on the first hinge at approximately a 45 degree angle from the base 120. The second arm 145 is rotated approximately 45 degrees from the first arm 125 via the second hinge 140. In this embodiment of the invention, the second arm 145 is rotated in a clockwise direction from its resting position. As illustrated in FIG. 5A, this results in a second arm 145 being parallel to the surface on which the base 120 rests and being in a parallel plane to the base 120. The second arm 145 includes a telescoping section 147. The telescoping section 147 extends the length of the second arm 145 so that the camera head assembly 110 is positioned above the surface and not immediately above the base 120. As illustrated in FIG. 5A, the camera head assembly 110 has been rotated approximately 90 degrees (using the third hinge 150) from its position in the rest position or configuration. As illustrated in FIG. 5A, the camera head assembly 110 has been rotated in a clockwise direction. In this position, the lens dial 112 (and thus the lens and camera) are pointed towards the surface on which a document or object is resting. The document is illustrated by reference number 131 in FIG. 5A. In this embodiment of the invention, as pictured in FIG. 5A, the document camera may view documents or objects up to 8.5" by 11".

Figure 5B:
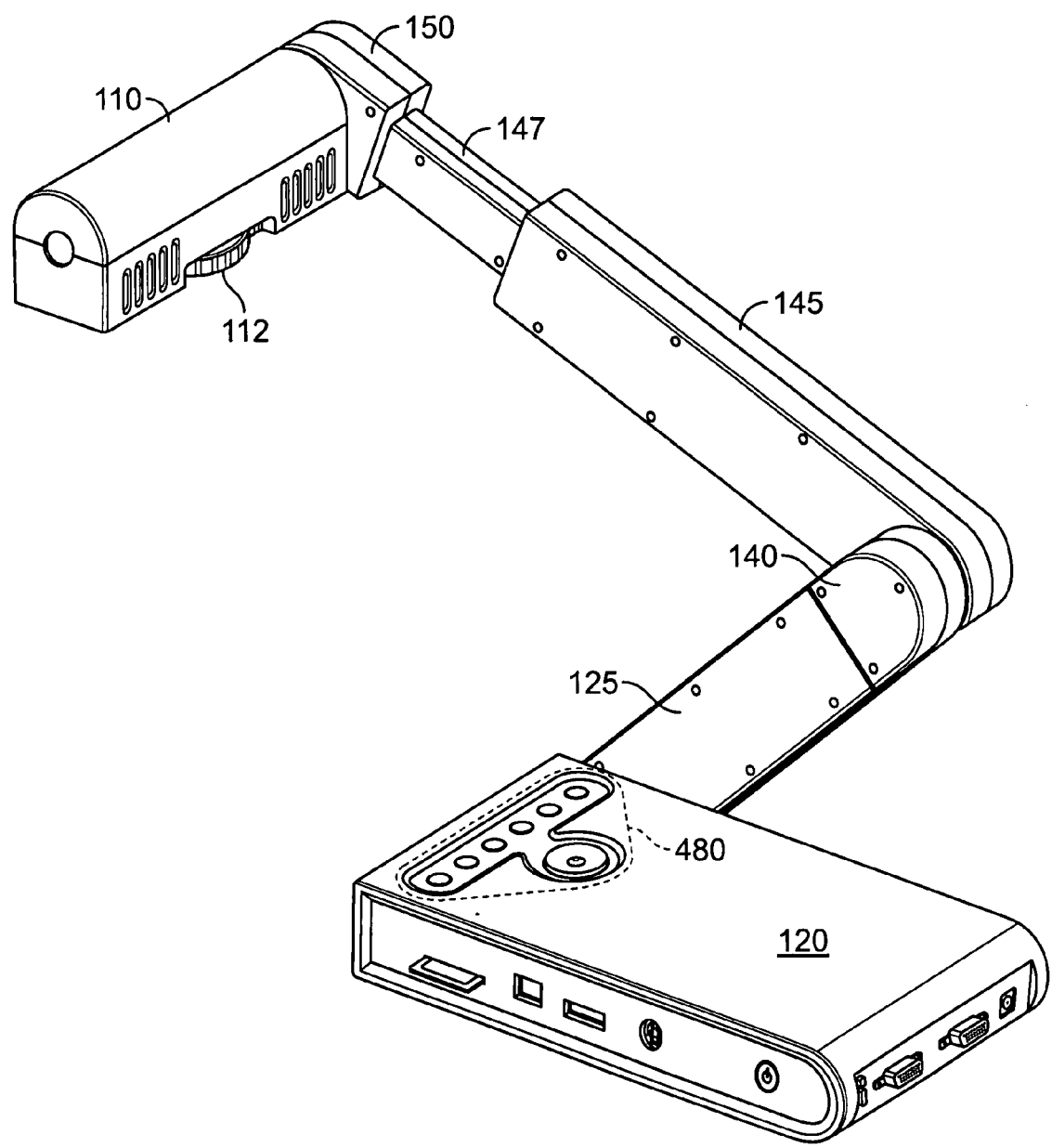
FIG. 5B is a top perspective drawing of a document camera in a further elevated position according to an embodiment of the invention.

FIG. 5B is a top perspective drawing of a document camera in a further elevated position according to an embodiment of the invention. In the embodiment of the invention illustrated in FIG. 5B, the first arm 125 is rotated between 45 degrees and 70 degrees from the base via the first hinge. As illustrated, the first arm 125 is rotated in a counterclockwise direction. The second arm 145 is rotated between 45 degrees and 85 degrees from the first arm 125 utilizing second hinge 140. As illustrated in FIG. 5B, the second arm 145 is rotated in a clockwise direction from the first arm 125. This results in the second arm 145 resting slightly pointed upward, as compared to the plane of the surface on which the base lies. A telescopic section 147 of the second arm 145 is extended to increase the height that the second arm 145 rests above the surface. The camera head assembly 110 is connected to the second arm 145 via the third hinge 150. As illustrated in FIG. 5B, the telescopic section 147 of the second arm 145 is connected to the third hinge 150. The camera head assembly 110 (and the lens adjuster 112) face the surface on which the document imager is resting. The camera head assembly (as is illustrated in both FIGS. 5A and 5B) are rotated clockwise approximately 90 degrees from its resting position (as was illustrated in FIG. 4). In this embodiment of the invention, if the telescoping sections are not extended, the document image can view documents or objects up to 8.5" by 11."

Figure 6:
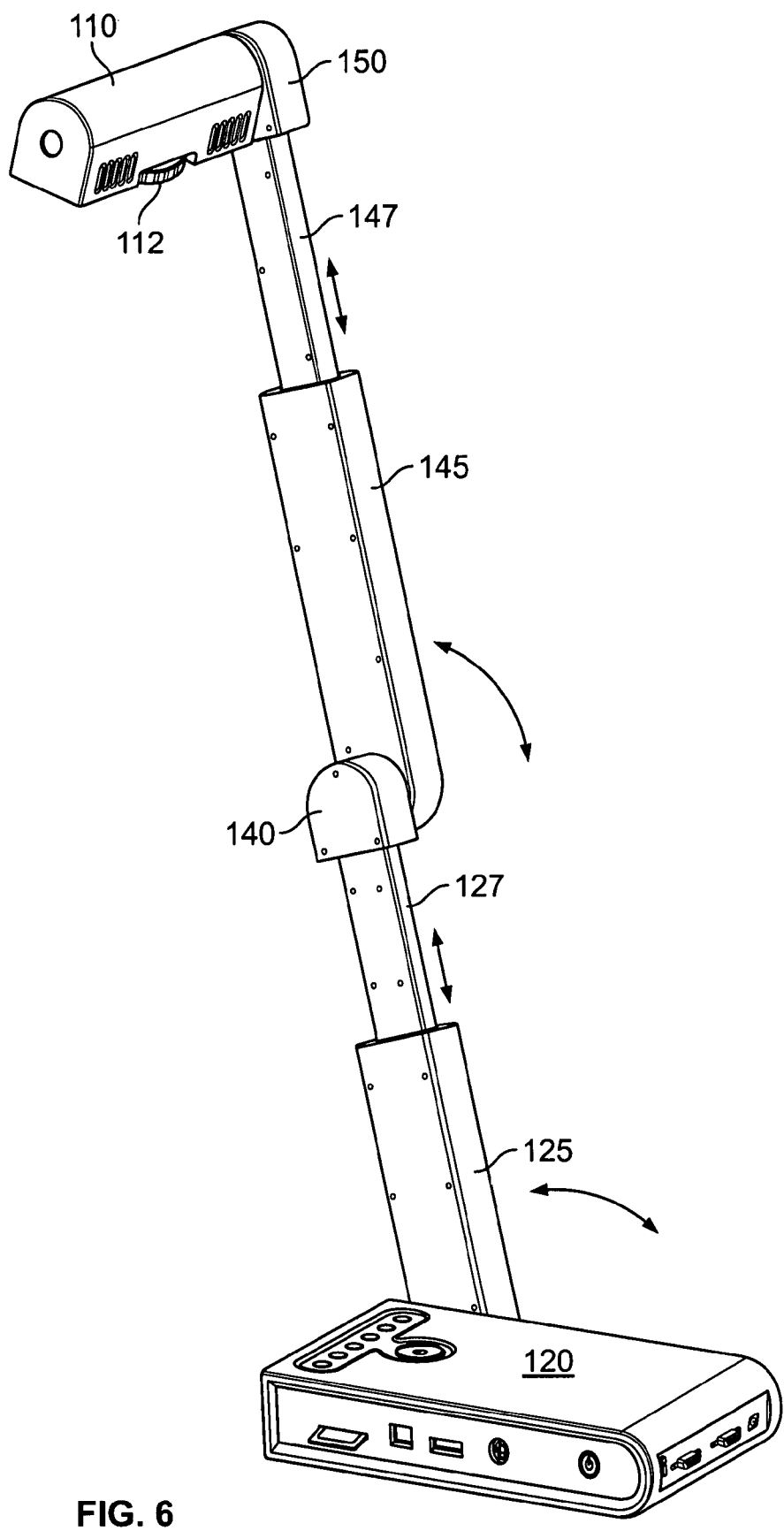
FIG. 6 illustrates a fully extended document camera according to an embodiment of the invention.

FIG. 6 illustrates a fully extended document according to an embodiment of the invention. In the embodiment of the invention, the first arm 125 is rotated between 90 and 145 degrees counterclockwise from the first arm's position during rest. As illustrated in FIG. 6, a portion of the first arm 125 does not extend past the base 120. In an embodiment of the invention, the portion of the first arm 125 does extend past the base 120. The length of the first arm 125 is extended by a telescopic section 127 of the first arm 125. The first arm 125 is connected to the second arm 145 via the second hinge 140. More specifically, an end of the telescopic section 127 of the first arm 125 is connected to the second hinge 140. The second arm 145 is rotated approximately 180 degrees clockwise with respect to the first arm 125. The 180 degrees clockwise from the second arm's 145 position when the portable document image is rest or storage position. Illustratively, the first arm 125 and the second arm 145 form almost a straight line. The second arm 145 has a telescopic section 147 which extends the length of the second arm. As noted above, the second arm 145 (and specifically the telescopic section 147 of the second arm 145) is connected to the camera head assembly 110. In the position illustrated in FIG. 6, the camera head assembly 110 is rotated clockwise between 5 and 45 degrees with respect the second arm 145 as compared to the position of the camera head assembly 110 when the document camera is in a rest position. In this embodiment of the invention, when telescoping sections are fully extended, the document camera can capture documents or objects up to 11" by 17."

In an embodiment of the invention similar to the embodiment of the invention illustrated in FIG. 6, the first hinge may not rotate past 90 degrees with respect to the base. After the first hinge rotates 90 degrees, the first arm 125 is perpendicular to the horizontal surface on which the base 120 resides. The telescopic section 127 of the first arm 125 may be fully extended. From its resting position next to the first arm 125 when the first arm 125 is fully extended, the second arm 145 may be rotated between 135 to 180 degrees in a clockwise direction. The telescopic section 147 of the second arm 145 may also be fully extended. When viewing the document camera from the side, the second arm may be rest between 90 degrees and 140 degrees from the horizontal surface on which the base 120 resides. In other words, in this embodiment when the second arm is fully extended, the second arm 145 is positioned to be between 0-45 degrees in a counterclockwise direction from the first arm 125. In this embodiment of the invention, when both telescoping sections 127 and 147 are fully extended, the document camera can capture documents or objects up to 11" by 17."

Figure 7A:
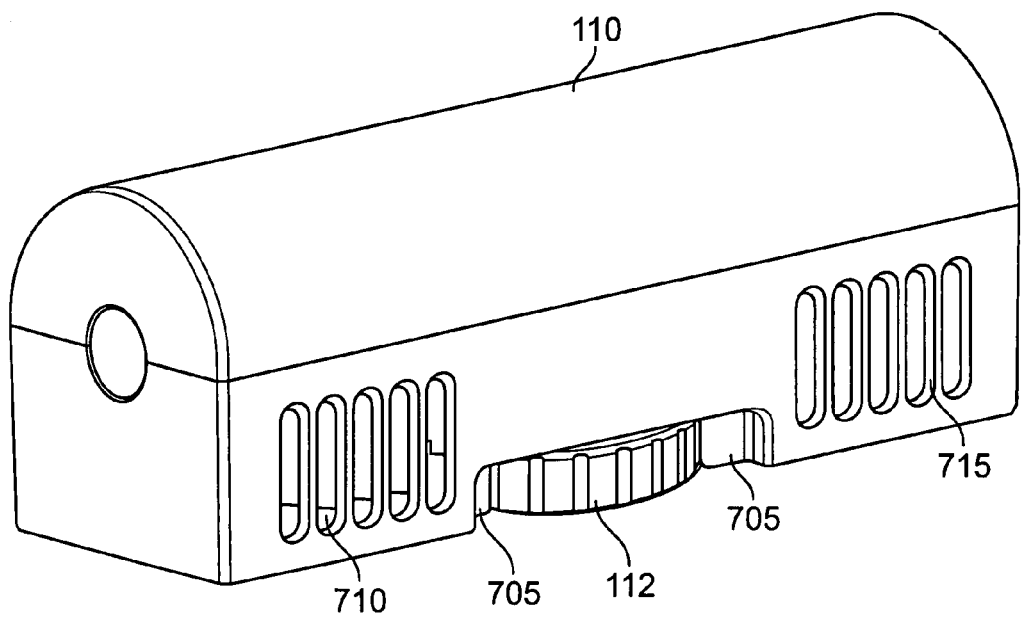
FIG. 7A illustrates a side view of the camera head assembly according to an embodiment of the invention.
Figure 7B:
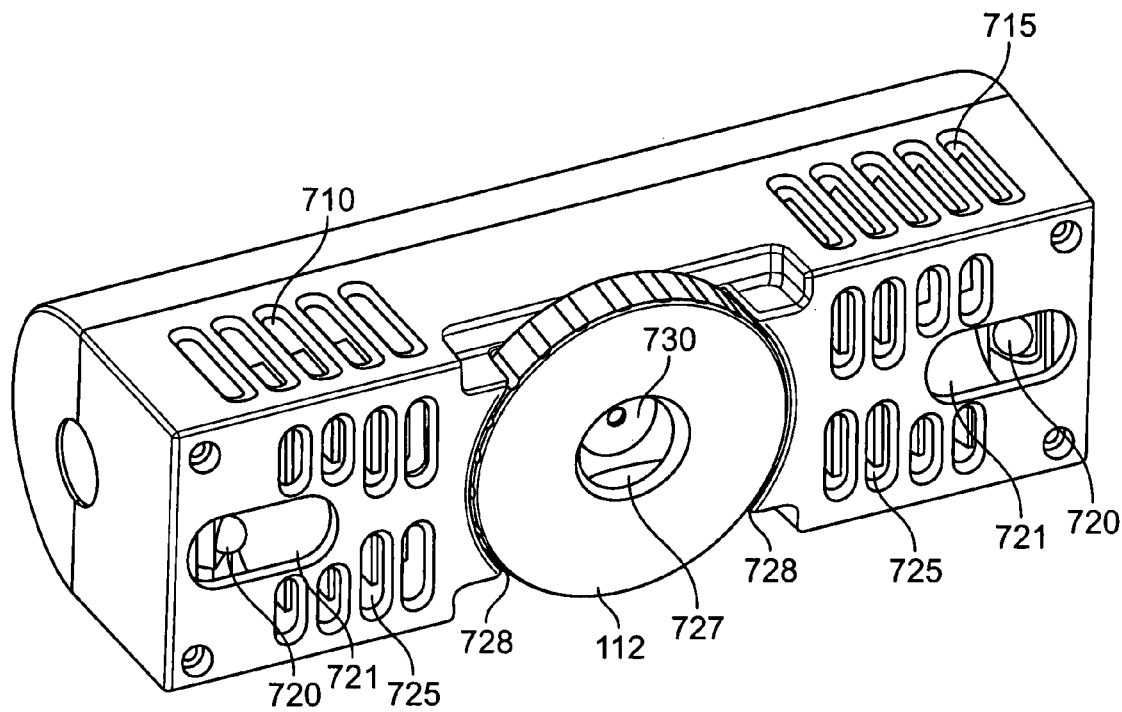
FIG. 7B illustrates a bottom view of the camera head assembly according to an embodiment of the present invention.

FIG. 7A illustrates a side view of the camera head assembly according to an embodiment of the invention. FIG. 7B illustrates a bottom view of the camera head assembly according to an embodiment of the present invention. The camera head assembly 110 illustrated in FIG. 7A includes a first side cooling vent 710 and a second side cooling vent 715. The side cooling vents 710 and 715 provide air flow for the electronics inside the camera head assembly 110, e.g., the CMOS sensor and the imaging circuit board. Although not pictured in FIG. 7A, the opposite side of the camera head assembly may include side cooling vents similar to the first cooling vent 710 and the second cooling vent 715. The camera head assembly 110 also includes a lens dial 112. The lens dial 112 is installed inside a recessed area of the camera head assembly. A side recess area 705 allows a user to grasp or turn the lens adjuster 112 in either a clockwise or counterclockwise direction.

FIG. 7B illustrates a bottom view of the camera head assembly according to an embodiment of the invention. The camera head assembly 110 includes Light Emitting Diodes (LEDs) 720 (although other illumination sources may be utilized). Light from the LEDs is directed downward through illumination openings 721 in a bottom face of the camera head assembly. In the embodiment of the invention illustrated in FIG. 7B, the illumination openings 721 may be oval in shaped to allow the light to cover a larger area beneath the camera head assembly 110. In an embodiment of the invention, the illumination openings 721 may be located on opposite sides of the bottom face of the camera head assembly 110. The bottom face also includes bottom venting holes 725. The bottom venting holes 725 allow for air venting of the camera head assembly electronics, such as the illumination devices 720, the sensor 730, and the imaging board. As illustrated in FIG. 7B, the bottom vending holes 725 may be located between the illumination openings 721 and the lens dial 112. The lens assembly includes the lens dial 112 and the lens 727. The lens assembly may be located in a recessed portion 728 on a bottom face of the camera head assembly 110. The recessed portion 728 may be circular in shape, as is illustrated in FIG. 7B.

The camera 730 may be a CMOS sensor. Alternatively, the camera device 730 may be a CCD sensor. The rotation of the lens dial 112 may rotate the lens assembly including the lens 727. In an embodiment of the invention, the camera device 730 may be adjusted by rotating the lens dial 112.

Figure 7C:
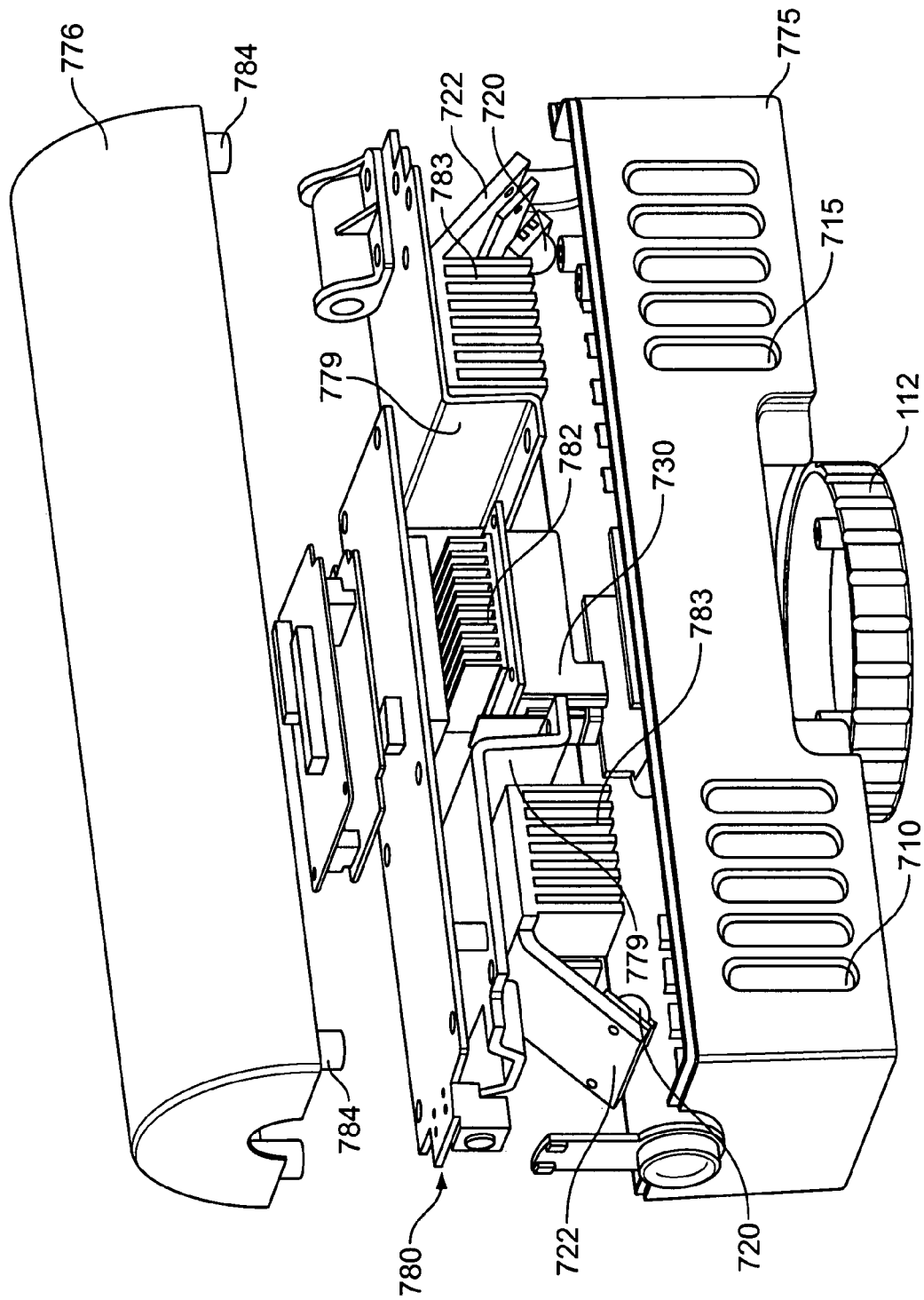
FIG. 7C illustrates an exploded view of the camera head assembly according to an embodiment of the invention.

FIG. 7C illustrates an exploded view of the camera head assembly according to an embodiment of the invention. The camera head assembly 110 includes a top cover 776 and a bottom cover 775. The top cover 776 and bottom cover 775 fit together to form the outside shell of the camera head assembly 110. A support plate 779 provides a center structure for the camera head assembly. The support plate 779 may be divided into two parts with one side being connected to one side of the camera or sensor 730 and the other side of the support plate being connected to a second side of the camera or sensor 730. A camera heat sink 782 is installed on the camera or sensor 730. The camera heat sink 782 couples heat from the camera or sensor integrated circuit to fins which are formed as a top part of the camera heat sink 782. A top surface of the support plate 779 is coupled to the imaging circuit board(s) 780 of the camera head assembly 110. In FIG. 7C, three circuit boards make up the imaging circuit board 780 but any number of circuit boards may be utilized.

The illumination sources 720 are mounted to illumination source plates 722. As illustrated in FIG. 7C, the illumination source 720 may be connected on a bottom part of the illumination source plates 722. The illumination source plates 722 may be positioned at a 45 degree angle. By placing the illumination source plate at an angle, the lights are pointed slightly inward and may illuminate a larger area of the display area. One end of the both of the illumination source plates 722 is connected to a illumination heat sink 783. The illumination heat sink 783 spreads heat from the LED circuitry and heat generated by the LED itself into the air via the cooling fins on a bottom part of the illumination heat sink 783. The illumination heat sinks 783 are located and connected to a bottom surface of the mounting assembly 779. The upper cover 776 includes posts 784 which are inserted into recesses (not shown) in the bottom cover 775 to create the camera head assembly A cable, also not shown, is runs from the imaging circuit board 780 to the second arm 145 through the third hinge 150.

As illustrated in FIG. 5A, in an embodiment of the invention, the document camera includes a control panel 480. The control panel 480 includes a five-way switch 481, a focus button 482, a zoom button 483, source button 484, a brightness button 485, a freeze/capture button 486, and a print button 487. The five-way switch 481 allows for the activation/or selection of items on a menu. The menu is displayed on an external device. In an embodiment of the invention, the menu may be displayed on a screen via a projection device that receives video from the VGA video output connector on the portable document camera. In an alternative embodiment, a computer display, having VGA capabilities, may be connected to the video output port and may display the menu. The five-way switch 481 includes a left arrow (to move in a left direction), a right arrow (to move in a right direction), an up arrow (to move in an upwards direction), and a down arrow (to move in a downward direction). A center button of the five-way switch clicks in to select and unselect images.

The document camera may be placed on a stable surface and plugged into an electrical outlet. The document imager may be activated by depression of a power button 430. An object may be placed on a part of a surface that is in front of the base 120 of the document camera.

Under certain operating conditions, a user may select the focus button. The focus button 482 controls movement of a focal point from a near point to a far point. When the focus button 482 is pressed, an image being displayed is refocused. No separate menu item appears on the computer display or projection screen, only the focus of the image being shown is adjusted. Under certain operating conditions, the up arrow or the down arrow on the five way switch 481 may be utilized to assist in focusing the image. A live display of the object being captured is resumed after the focus button 482 is not selected for a specified time period.

A zoom button 483 may enlarge a displayed image to a number of pre-set settings depending on a number of times the zoom button is depressed. Under certain operating conditions, there may be four pre-set settings, and if the zoom button is pressed four times, the fourth pre-set setting of the zoom is selected. The displayed image is then displayed at the fourth pre-set zoom setting. Under certain operating conditions, the on-screen menu or display may indicate potential zoom settings. The arrows on the five-way switch 481 may be utilized to navigate through the potential zoom settings and the selection key is utilized to select the desired zoom setting. After the desired zoom setting is selected, a live display of the object (with the selected zoom setting) resumes on the monitor or projection screen.

The source button 484 may allow the user to cycle through a number of image sources available for the document camera. Illustratively, the image sources may include memory cards, such as Secure Digital cards, Universal Serial Bus (USB) Input (e.g., from a thumb drive, digital camera, computer, etc.), VGA video input, and/or S-video input. After the source button 484 is depressed, a menu listing a number of the potential options may be displayed on the screen (e.g., projection screen or computer screen). Under certain operating conditions, if certain devices have not been inserted into the portable document camera, the menu items may not be highlighted (and available for selection). Illustratively, if a USB drive or an SD memory card are not inserted into the portable document imager, the USB and/or SD memory card menu item may not be included in the menu or may not be highlighted (and thus available for selection). The five-way switch 481 may be utilized to select one of the sources. Depending upon how the sources are displayed in the menu (e.g., horizontally or vertically), the up/down arrows or the left-right arrows can be utilized to navigate to the desired option and the center button may be utilized to select the identified or desired option. After the source has been selected, the document camera displays an image(s) from the selected source.

The brightness button 485 allows an adjustment of the brightness of the image being displayed. The selection of the brightness button 485 results in a on-screen display of brightness levels on the screen. Under certain operating conditions, the user may utilize the brightness button to modify the brightness level of the image being displayed. Under certain operating conditions, the user may utilize the arrow keys and the selector button of the five-way switch 481 to select the brightness level for the displayed image. After the brightness of the image has been selected (or not adjusted for a certain time frame), live display of an image of the object is resumed.

The freeze-capture button 486 causes a displayed image to freeze. If the freeze/capture button is pressed once (and then not pressed for at least a predetermined time), the image freezes on the screen. After the predetermined time has elapsed and the freeze/capture button 486 is pressed again, the image unfreezes. The live display of the image resumes.

If the freeze-capture button 486 is pressed once and held down for a set period of time (e.g., two seconds), the image is captured. As the image is being captured, the display of the image is frozen on the screen. The image is captured to a memory in the portable document imager. Under certain operating conditions, the image may be captured to an inserted USB drive or, alternatively, a memory card. The image may also be captured on a on-screen memory. After the image is captured, the live display of the image resumes.

The print button 487 may be selected to print whatever is being output or displayed by the document camera. The document camera utilizes PictBridge software to print directly from the portable document imager to a printer. The photo quality printer may be attached to the USB port and the printed image may be transmitted via the USB port to the photo quality printer. If a live display is being printed, i.e., input being received via a video port or from the document camera, the image being displayed on the screen freezes, while the printing operation is occurring. After a period of time where the live image is processed for printing, a printing message then appears on the screen. If an image is a still image, i.e., from a USB thumb drive or from a memory card, a printing message appears on the screen after the print option is selected. After the processed image is sent to the printer, a live display is resumed if the original image was the live display and a still image displayed is resumed if the original image was a still image.

A menu may be displayed by the selection of the center button in the five-way switch 481. Once the menu is displayed, different options may be selected by use of the up/down and left/right arrow keys. In an embodiment of the invention, menu options appearing on the screen after depression of the center button are: 1) Color/B & W; 2) Invert; 3) White Balance; 4) Memory; 5) Split Screen; 6) Language; and 6) Exit.

Under certain operating conditions, two options may be displayed: 1) Change to Color; or 2) Color to Black and White. Selection of the Color menu option causes a black and white image to change to color. After the image has been changed to color, the menu items (e.g., Color/B & W, Invert, etc.) are still displayed on the screen. The selection of color to black and white menu option causes the displayed image to change from color to black and white. After the image has been changed to black and white, the menu items are still displayed on the screen. Under other operating conditions, a Color/Black & White menu selection results in the opposite type of image being displayed on the screen. Illustratively, if a color image is being displayed on the screen, the selection of the Color/Black & White menu option causes the displayed image to be displayed in black and white.

The selection of the invert menu option results in the displayed image being changed to the opposite state. In other words, if an image is a positive image, the image is changed to a negative image after selection of the invert menu option. If an image is a negative image, the image is changed to a positive image after selection of the invert menu option. After the inversion of the image, the menu option is still displayed on the screen.

The selection of the white balance menu options results in a white balance submenu being displayed. The white balance submenu options include: 1) automatic; 2) incandescent; 3) daylight; 4) cloudy; 5) shade; and 6) fluorescent. Under certain operating conditions, as the selection bar passes over the menu option, e.g., like incandescent, the background of the menu (or display) reflects the change imparted by the menu option. The user can select any on of the white balance settings (e.g., daylight, cloudy, fluorescent) using the selection button on the five way switch. If the user selects the automatic white balance menu option, the document camera electronics make a determination of an appropriate white balance. Under certain operating conditions, the document camera may have a sensor and the document camera electronics may receive input from the light sensor, and determine the white balance settings based on the sensor readings. Under other operating conditions, the white balance settings may be preset, either by an operator or in some cases when the document camera is manufactured.

Figure 7D:
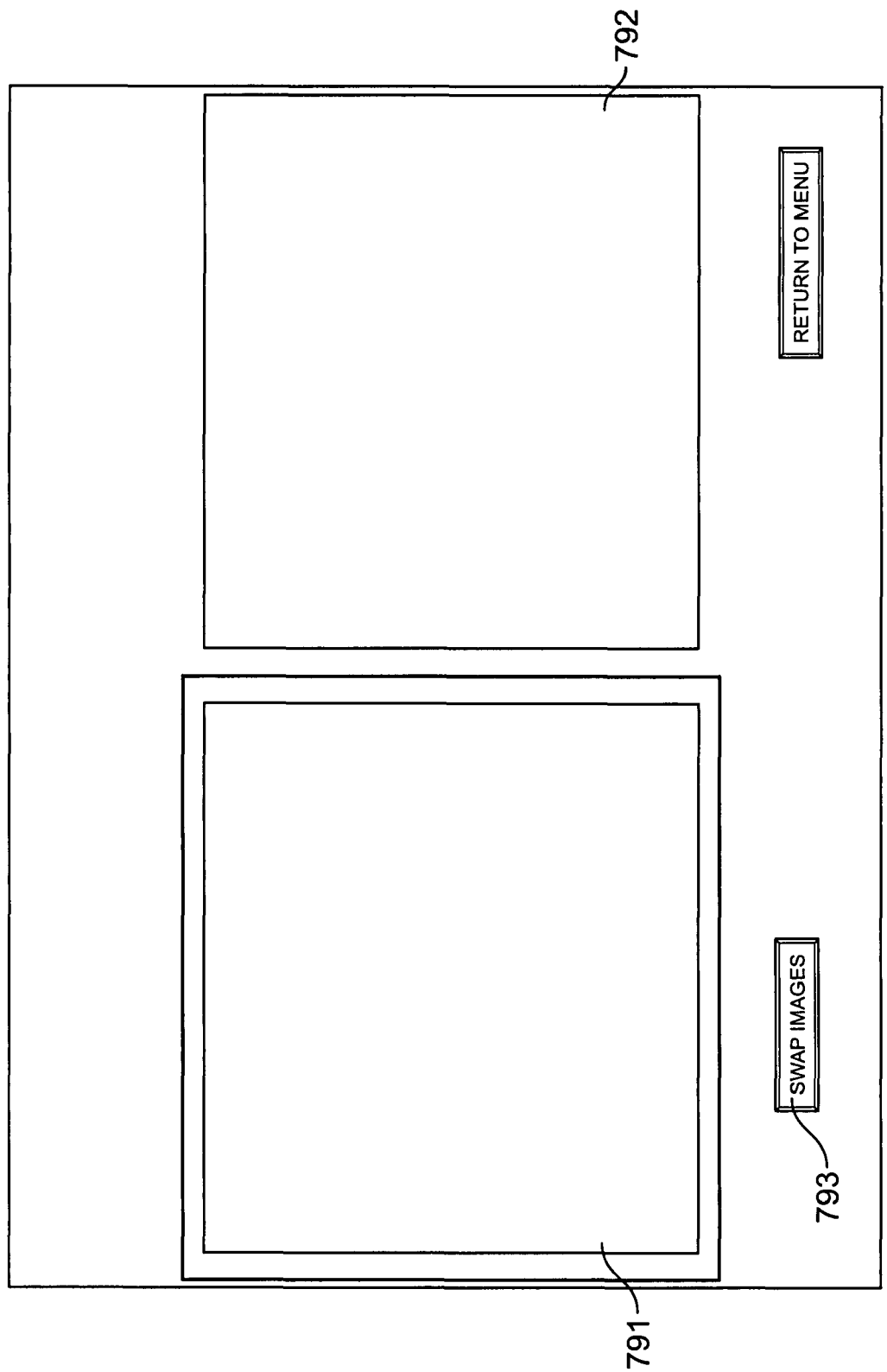
FIG. 7D illustrates a split screen menu according to an embodiment of the invention.

A split screen option may be selected. If the split screen option is selected, a menu appears on the display to allow selection of a source for a left image and also a right image. For example, FIG. 7D illustrates a split screen menu according to an embodiment of the invention. The split screen menu includes a left picture holder 791 and a right picture holder 792. The split screen menu also includes a swap images selection (e.g., swap images button 793), which switches an image in the left picture holder 791 to an image in the right picture holder 792, or vice versa. The user can also return to the main menu by selecting the "Return to Main Menu" option. The left picture holder 791 or the right picture holder 792 may be selected. FIG. 7D illustrates the selection of the left picture holder 791. Either holder may be selected by the use of the center button on the five-way switch 481. After either holder is selected, a source submenu is presented on the display. Illustratively, the source submenu may include menu options 1) VGA; 2) memory; 3) SD card; or 4) USB. If a source (input) is not present, then these options may not be highlighted on the source submenu. These options may appear as grayed out text which prevents the menu option from being selected. After the source has been selected, a number of images (or list of images) may be presented for selection. For example, if a SD card is selected as the source, a number of file names (or thumbnail images) may be presented for selection. The five-way switch 481 may be utilized to select the file name (or image). Illustratively, if the VGA is selected as the source, then the video being input will be presented in the selected picture holder (e.g., the left image holder). After the image has been selected, the menu returns to the split screen menu. The second picture holder (e.g., the right picture holder) may be selected at the split screen menu using the selection button on the five-way switch. The source submenu appears and the source is selected for the second image holder and the user is directed t to the Split Screen mode, which displays the two selected images side by side on the screen. To exit Split Screen mode, the center button of the five way switch is selected and the split screen menu is exited.

A language menu option may be selected. If the language is selected, a number of languages may be displayed for selection. For example, these languages may be English, French, Spanish, or Portuguese.

A memory menu option may be selected. If the memory menu option is selected, a plurality of thumbnail images appears with options on a portion of the screen, e.g., the bottom the screen. FIG. 7E illustrates a memory menu according to an embodiment of the present invention. The memory menu includes selection buttons for 1) export; 2) slideshow; 3) select all; 4) clear all; 5) delete; 6) rotate; and 7) return to main menu. On the memory menu, all of the up/down and right left arrows can be utilized to navigate in the four directions. Under certain operating conditions, as is illustrated in FIG. 7E, one or two arrows may appear on both sides of the displayed images in the memory menu. The arrows on the side may be navigated to by operating the up, down, left or right button of the five-way switch 481. If either (or both) of these arrows are present, additional thumbnail images are present within the memory of the document camera and clicking (or depressing of the center button of) the five-way switch may results in seeing a previous page (or column) or a next page of available images. To select images, the center button of the five-way switch is depressed. To unselect images, the center button of the five-way switch is depressed again.

An export menu option may be selected by using the arrows of the five way switch and then the center button. The selection of the export option allows images to be exported to specified external memory devices. After the export option is selected, the images to be exported may be selected. A user may use the arrow keys and the center button of the five way switch to select one or a plurality of images to be exported at the memory submenu. After the images have been selected, the source submenu is displayed on the screen. Under certain operating conditions, a memory card and a USB drive may be listed on the source submenu. If the memory card or the USB drive are not inserted into the SD Card slot or USB slot, these options may appear in grayed out text and may not be selectable. If these options are available, i.e., the SD card or USB drive is inserted, then these options are highlighted, e.g., appear in bold text. After the source has been selected, the selected images start to be transmitted to the selected source (e.g., USB drive or SD card). The screen may display a message identifying that exporting of images is occurring or may display an error message (if for example the memory card is disconnected). After completion of the exporting of the selected images, the screen returns to the memory menu.

A slideshow menu option may be selected. The slideshow option allows for selection of pictures and then presenting the selected pictures once or in a loop on the external display. On the memory screen, images (e.g., image thumbnails) are selected to be utilized in a slideshow. After the images have been selected, the slideshow menu selection (e.g., button) is selected to enter the slideshow mode. The slideshow begins and the images may be navigated through using the arrow keys of the five-way switch 481. Under certain operating conditions, the images are played for a specified period of time and then the next selected image is played. The images are played in a sequential fashion. The down arrow may be utilized to go to additional menu selections that are listed on the bottom of the screen.

The slideshow mode may be exited by depression of the center button of the five-way switch 481. After the slideshow mode has been exited, the memory menu appears with a display of the thumbnail images. Under certain operating conditions, the previously selected items (for the slideshow) remain highlighted on the memory menu.

A "select all" menu may be activated. If the "select all" option, all of the images in the memory menu are selected. After all of the images are selected, one of the other menu options on the memory menu may be selected. Illustratively, the export menu option may be selected to export all of the images to an external memory device, an import menu option may be selected. Under certain operating conditions, the "select all" option may be utilized to select images for import into memory. Illustratively, all images from a SD card may be imported into the memory. Similarly, all images from a USB thumb drive may be imported into the memory. Under certain operating conditions, the "select all" menu option may be selected and then the slideshow menu option may be selected. All of the selected images are then utilized in the slideshow.

A clear menu option may be selected. The clear option removes the selection of images on the memory menu. After the clear option is selected, the memory menu is displayed without any of the images being selected (e.g., thumbnail images).

A delete menu option may be selected. On the memory menu, a number of images are selected. The delete option is activated and the selected images are deleted from memory. The deletion of the thumbnail images removes the images from the thumbnail view of the memory menu. If there are thumbnail images that were not displayed on the original memory menu, some of these additional thumbnail images now repopulate the screen.

A rotate menu option may be selected. On the memory menu, an image is selected. Additional images may also be selected on the memory menu. The rotate option is activated and all of the selected images are rotated in the thumbnail view. After the images have been rotated, the memory menu is displayed with the selected image(s) in the rotated position.

An exit menu returns the user to a main document camera menu.

FIGS. 8A and 8B illustrates a document camera including extendable legs to add additional height to the document camera. The additional height allows the document camera to capture a larger viewing area (and thus larger objects or documents). The base 120 includes leg deployment switches 805 and 815. The base 120 includes storage cavities (not shown) for the pair of legs 810 and 820. The cavities may be located along opposite sides of the base 120. A width of the cavity may be slightly larger than the width of the support legs 810 and 820. The leg deployment switches 805 and 815 are moved from the position illustrated in FIG. 8A to the position illustrated in FIG. 8B. Under certain operating conditions, leg deployment switches 805 and 815 operate independently of one another. In other words, deployment switch 805 may be moved without pressing deployment switch 815. If only deployment switch 805 is moved, then only the pair of support legs 810 are moved into position. If both deployment switches 805 and 815 operate together, then once one of deployment switches 805 and 815 are moved, all four support legs are moved. The support legs are moved 90 degrees from a stored position. Under certain operating conditions, one of the legs in each support leg pair 810 and 820 is moved in a clockwise manner direction and the other leg in each support leg pair 810 and 820 is moved in a counterclockwise manner. The support legs may be up to 12 inches in height, which increases the height of the document imager by 12 inches. In addition, each of the support legs may have a rounded portion 811 and 821 which is placed on the surface when the support legs are extended.

FIGS. 9A, 9B, and 9C illustrate use of a macro lens which slides over a document camera lens according to an embodiment of the present invention. In the embodiment of the invention illustrated in FIG. 9A, the original lens 727 is installed in an inset section 940 of a bottom face of the camera head assembly. In an embodiment of the invention, the inset section 940 of the bottom face of the camera head assembly 110 is a rectangular shape. Illustratively, two slide channels (one of which is illustrated by reference number 930) are located on two side walls of the inset section 940. The lens slide assembly 920 has tabs which fit into the slide channels (e.g., slide channel 930) to allow the lens slide assembly 920 to move to different position. When the macro lens not being utilized, as is illustrated in FIG. 9B, the lens slide assembly is located on a right hand side of the inset section 940. When a macro lens 910 is being utilized (as is illustrated in FIG. 9C), the lens slide assembly 920 is moved to the left hand side of the inset section 940 which results in the macro lens being position directly over the original lens 727. The macro lens allows a user to see a wider angle of viewing. The lens slide assembly 910 includes a finger grip area 951 on each side to allow for easy grasping and moving of the lens slide assembly 910.

All lenses may introduce distortions into a captured image. In order to capture large documents, when you have a document camera that is not fully extended, the document camera may include a wide-angle lens. A wide angle lens may produce a fish eye effect which is noticeable on a perimeter of a captured image. This "fish eye" effect and other distortions are a result of the design of each lens. In other words, each lens has specific fish eye distortions when capturing images. Under certain operating conditions, each lens may produce different fish eye distortions depending on the size of the capture area, e.g., a first fish eye distortion for an 11" by 17" capture area and a second fish eye distortion for an 8.5" by 11" capture area. In order to correct for this distortion, a correction software module may include distortion parameters for each lens, and potentially for different capture area sizes for each lens. When the image is processed by the document camera, the distortion parameters are utilized to "correct" the image, i.e., eliminate as much of the distortion as possible. The corrected image is then transferred out via the video output port, e.g., VGA output port 445.

Figure 10:
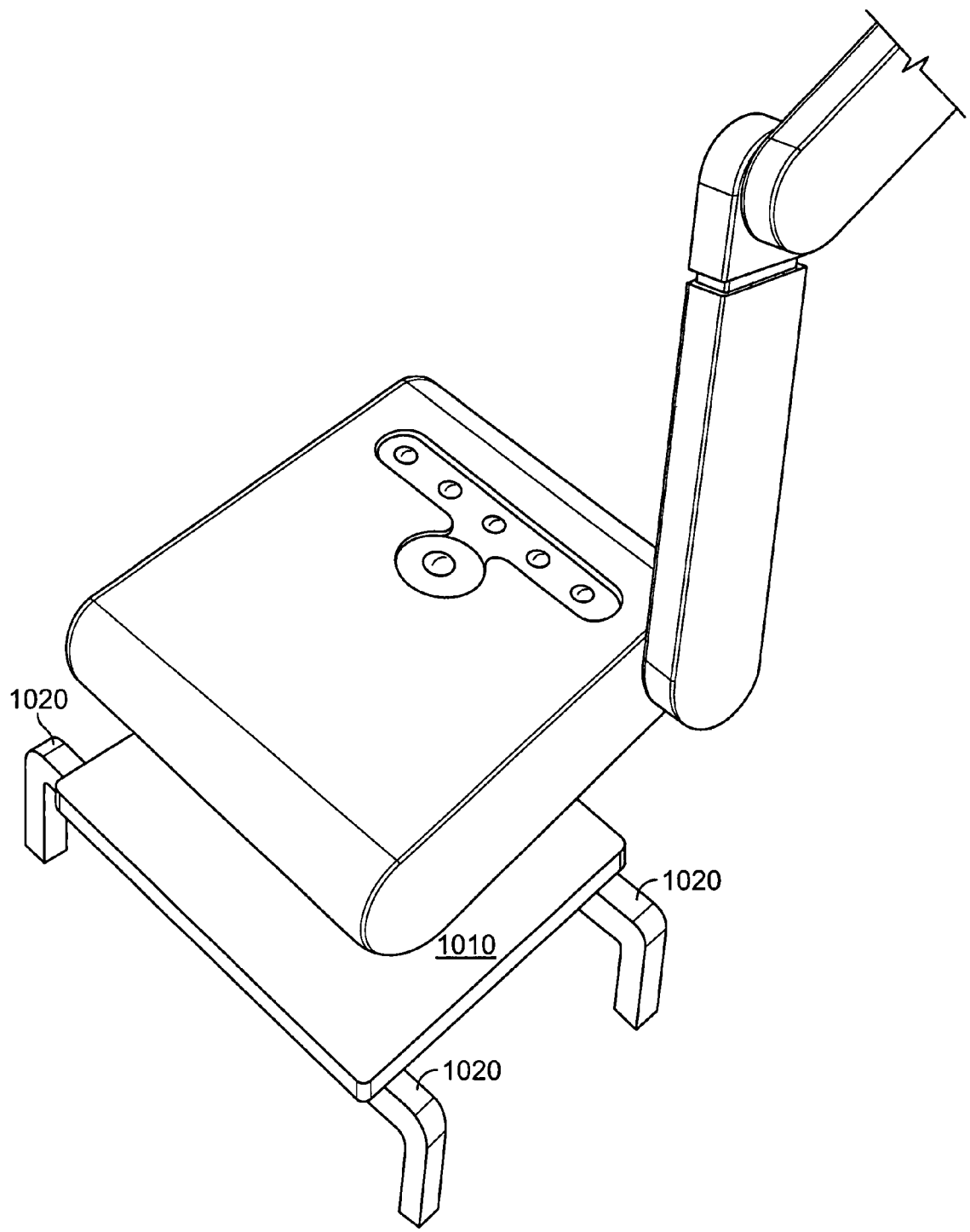
FIG. 10 illustrates a base for increasing a height of a document camera according to an embodiment of the invention.

FIG. 10 illustrates a base for increasing a height of a document camera according to an embodiment of the invention. The base assembly includes a base plate 1010 and four support legs 1020. The base plate 1010 has approximately the same dimensions as the dimensions of the base of the document camera. Illustratively, FIG. 10 includes a rectangular base plate 1010 and each of the support legs 1020 exits from a side of the base plate 1010 at approximately a corner of the base plate 1010.

Figure 11A:
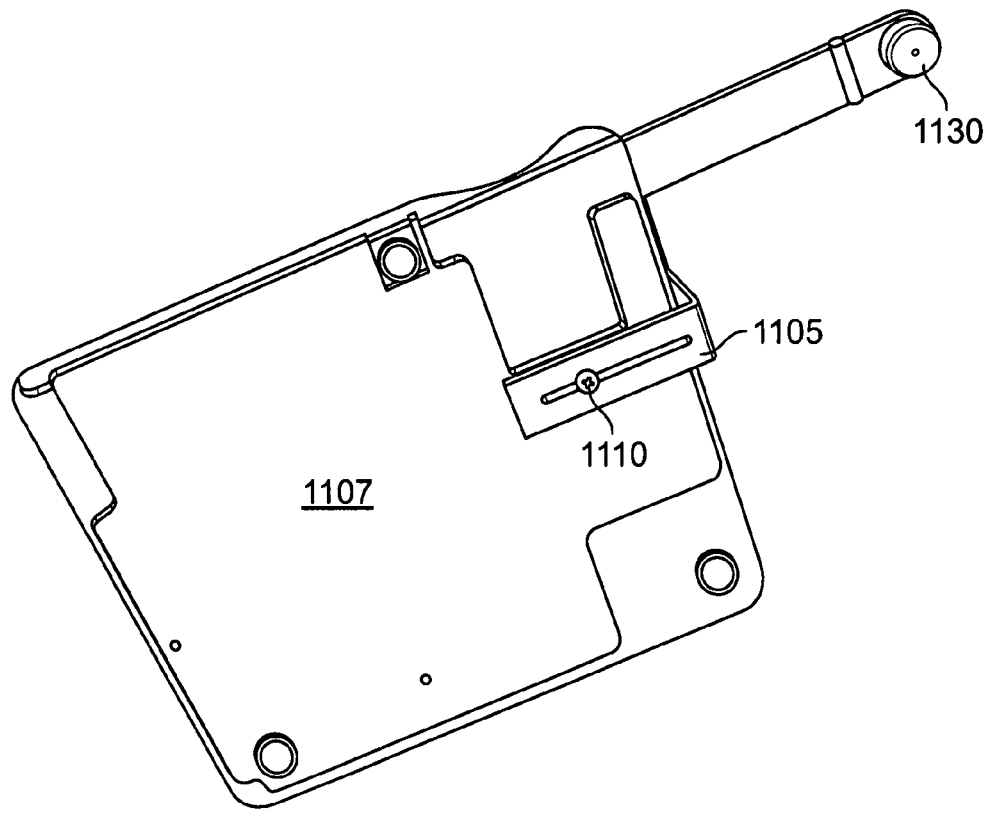
FIG. 11A illustrates a bottom view of an attachable document camera attached to a projector according to an embodiment of the present invention.
Figure 11B:
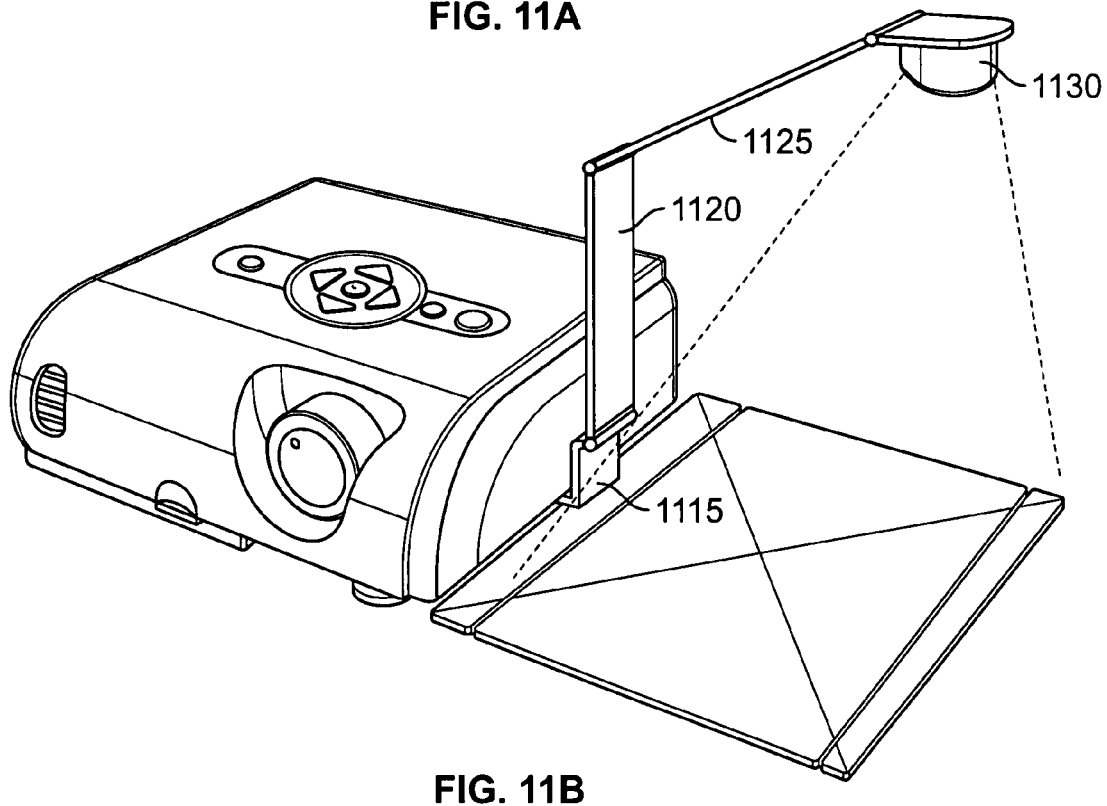
FIG. 11B illustrates a top perspective view of an attachable document camera attached to a projector according to an embodiment of the present invention.

FIG. 11A illustrates a bottom view of an attachable document camera attached to a projector according to an embodiment of the present invention. FIG. 11B illustrates a top perspective view of an attachable document camera attached to a projector according to the present invention. The attachable document camera includes a base connection plate 1105, a vertical connection plate 1115, a first arm 1120, a second arm 1125, and a camera head assembly 1130. The base connection plate 1105 is connected to a bottom face 1107 of the projector utilizing a fastener 1110. The vertical connection plate 1115 is pressed against a side face of the projector in order to provide extra support for the attachable document camera. The vertical connection plate 1115 is connected to a base connection plate 1105. The vertical connection plate 1115 is connected to the base connection plate 1105 at approximately a 90 degree angle. The first arm 1120 is connected to the vertical connection plate 1115. The second arm 1125 is connected to the first arm 1120 at an angle of between 90 and 180 degrees. The camera head assembly 1130 is connected to the second arm 1125.

Figure 12A:
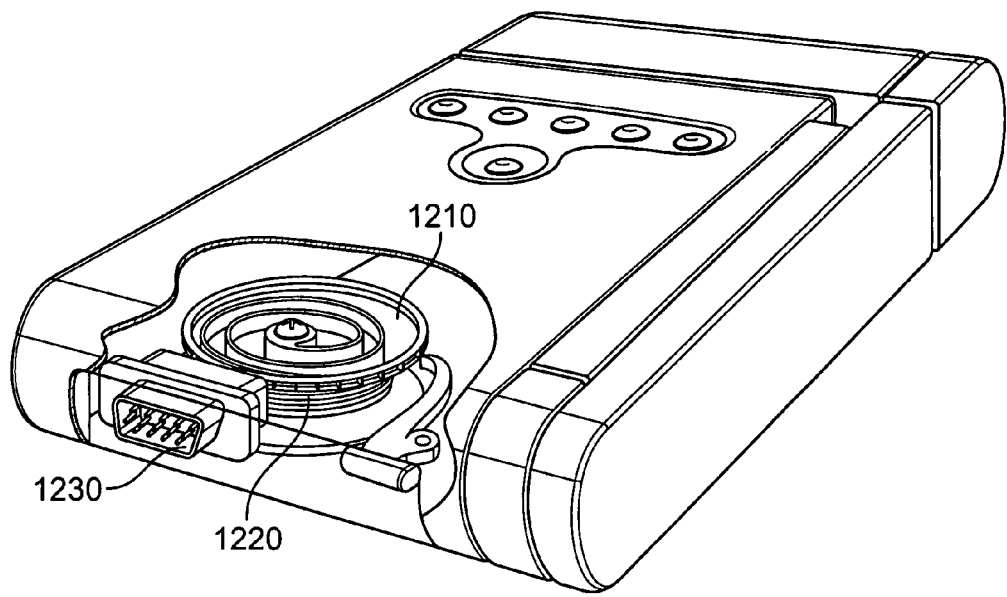
FIGS. 12A and 12B illustrates a retractable VGA output cable according to an embodiment of the invention.
Figure 12B:
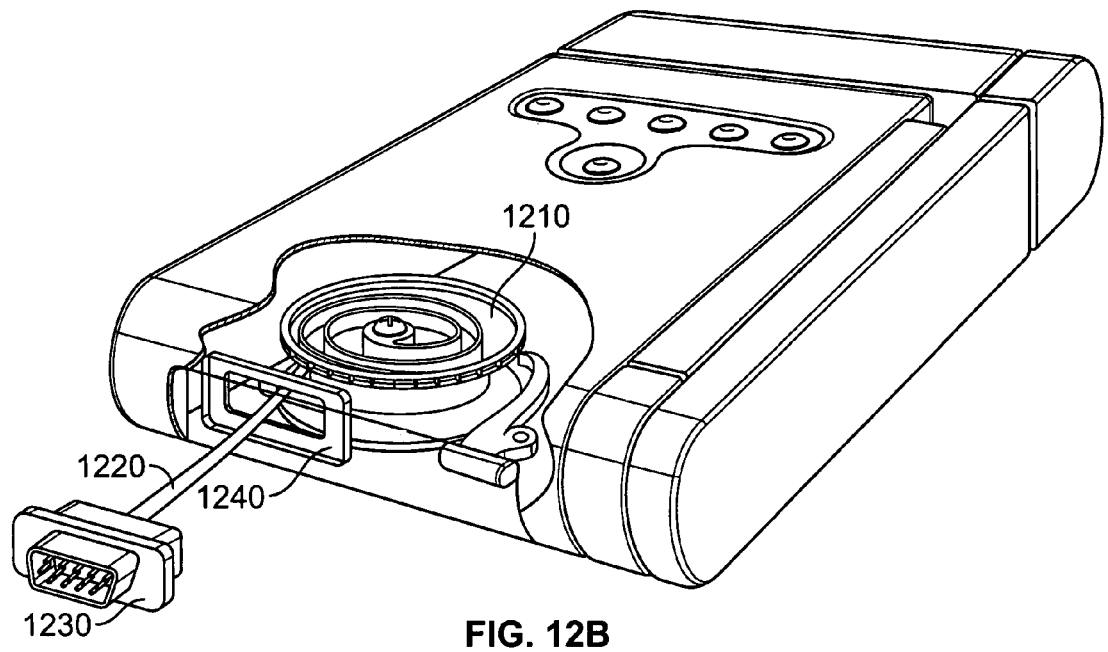

FIGS. 12A and 12B illustrates a retractable VGA output cable according to an embodiment of the invention. FIG. 12A includes a VGA output cable in a retracted position and FIG. 12B includes a VGA output cable in an extended position. The retractable VGA cable includes a cable spool 1210, a cable 1220, and a VGA output connector 1230. When the VGA cable is in a retracted position, the cable 1220 is wrapped in a circular manner around the cable spool 1210. The VGA output connector 1230, when the cable is retracted, is located on a face of the document imager. When the VGA cable is in an extended position, the VGA output connector 1230 is detached or pushed out from a connector plate 1240. The cable 1220 also passes through the connector plate 1240 when the VGA cable is in an extended position When the cable 1220 is in a fully extended position, only a portion of the cable remains on the cable spool 1210.

Figure 13:
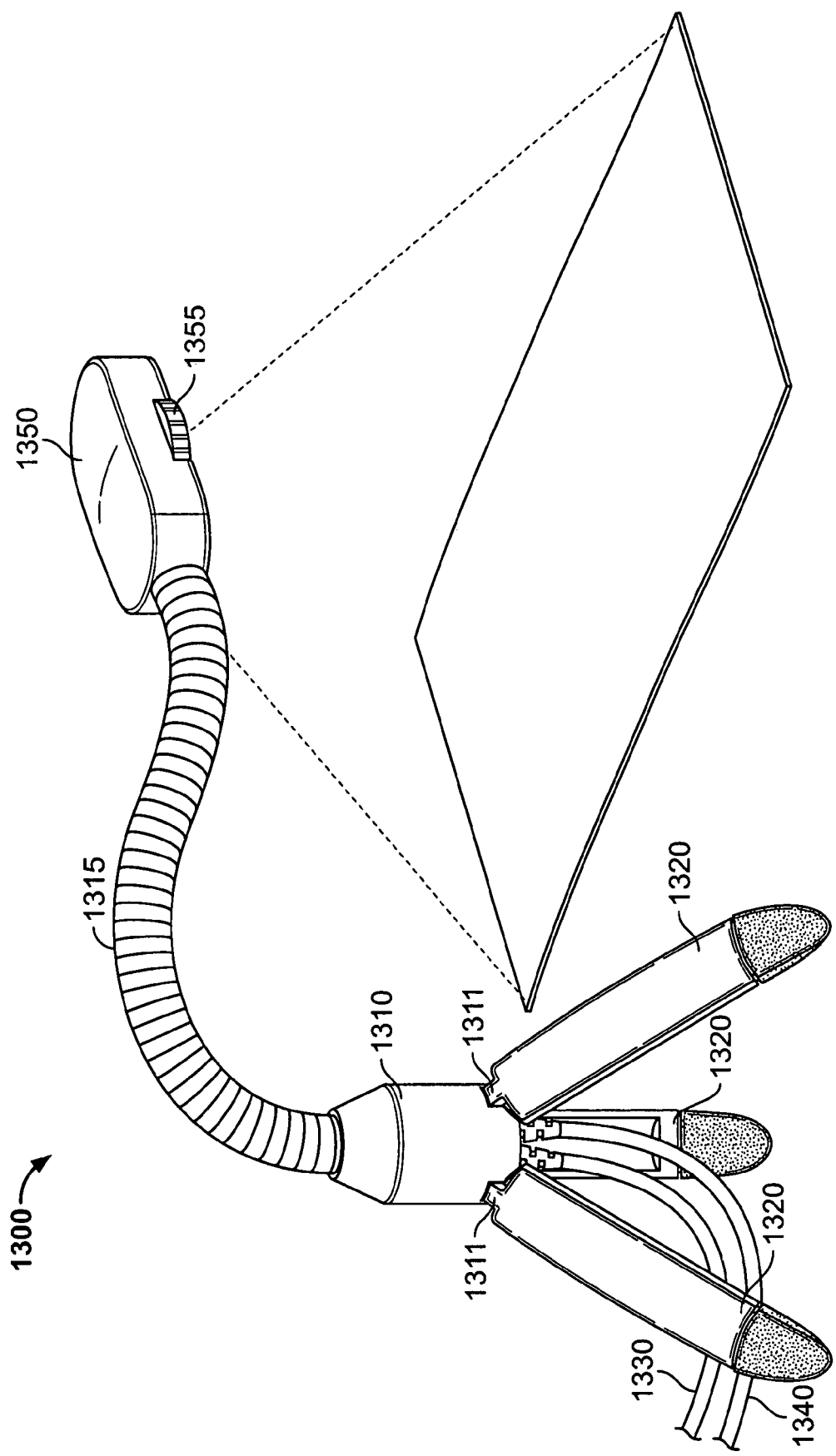
FIG. 13 illustrates a portable document camera according to an embodiment of the invention.

FIG. 13 illustrates a portable document camera according to an embodiment of the invention. The portable document camera 1300 includes a base 1310, a plurality of support legs 1320, a power cable 1330, a video output cable 1340, a flexible arm 1315, and a camera head assembly 1350. The power cable 1330 and the video output cable 1340 provide power and video output, respectively. The plurality of support legs 1320 provide support for the base 1310 of the portable document camera. In an embodiment of the invention, the plurality of support legs 1320 are connected to the base 1310 via hinges 1311. The plurality of support legs may be made of rubber. Under certain operating conditions, the plurality of support legs 1320 may be hinged in an upward manner. Under certain operating conditions, the plurality of support legs 1320 may be closed together to cover the VGA cable 1330 and the power cable 1340. When the portable document camera is folded, the camera occupies a small footprint. The flexible arm 1315 connects the base 1310 to the camera head assembly 1350. The camera head assembly 1350 includes a camera adjuster 1355. The camera adjuster 1355 moves the camera in the camera head assembly 1350 from a portrait orientation to a landscape orientation or vice versa. The flexible arm 1315 may be made of a adjustable, semi-rigid, flexible material. It may be referred to as a gooseneck.

Figure 14A:
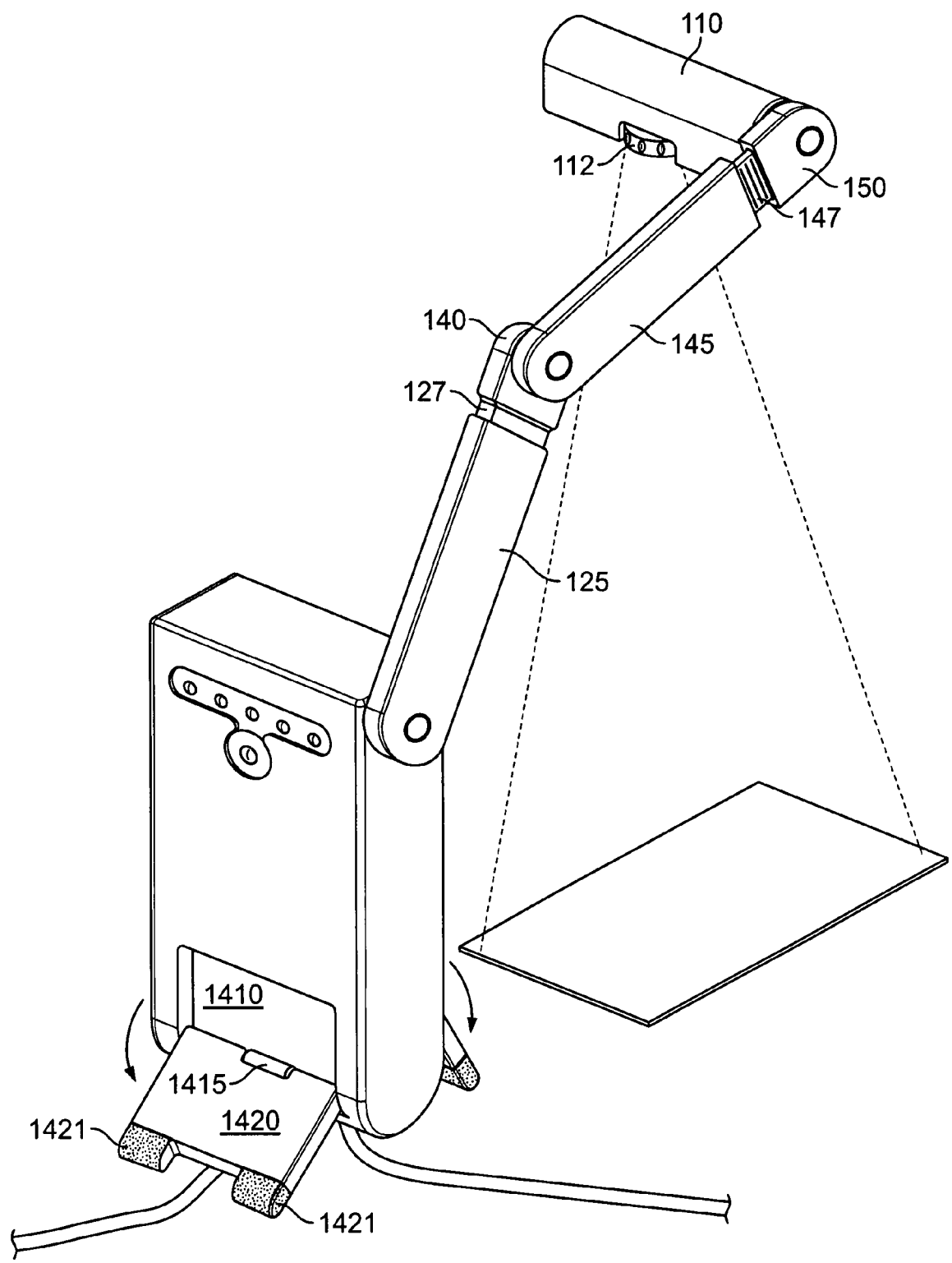
FIG. 14A illustrates a top perspective view of the document camera of FIG. 4 placed vertically on a surface.
Figure 14B:
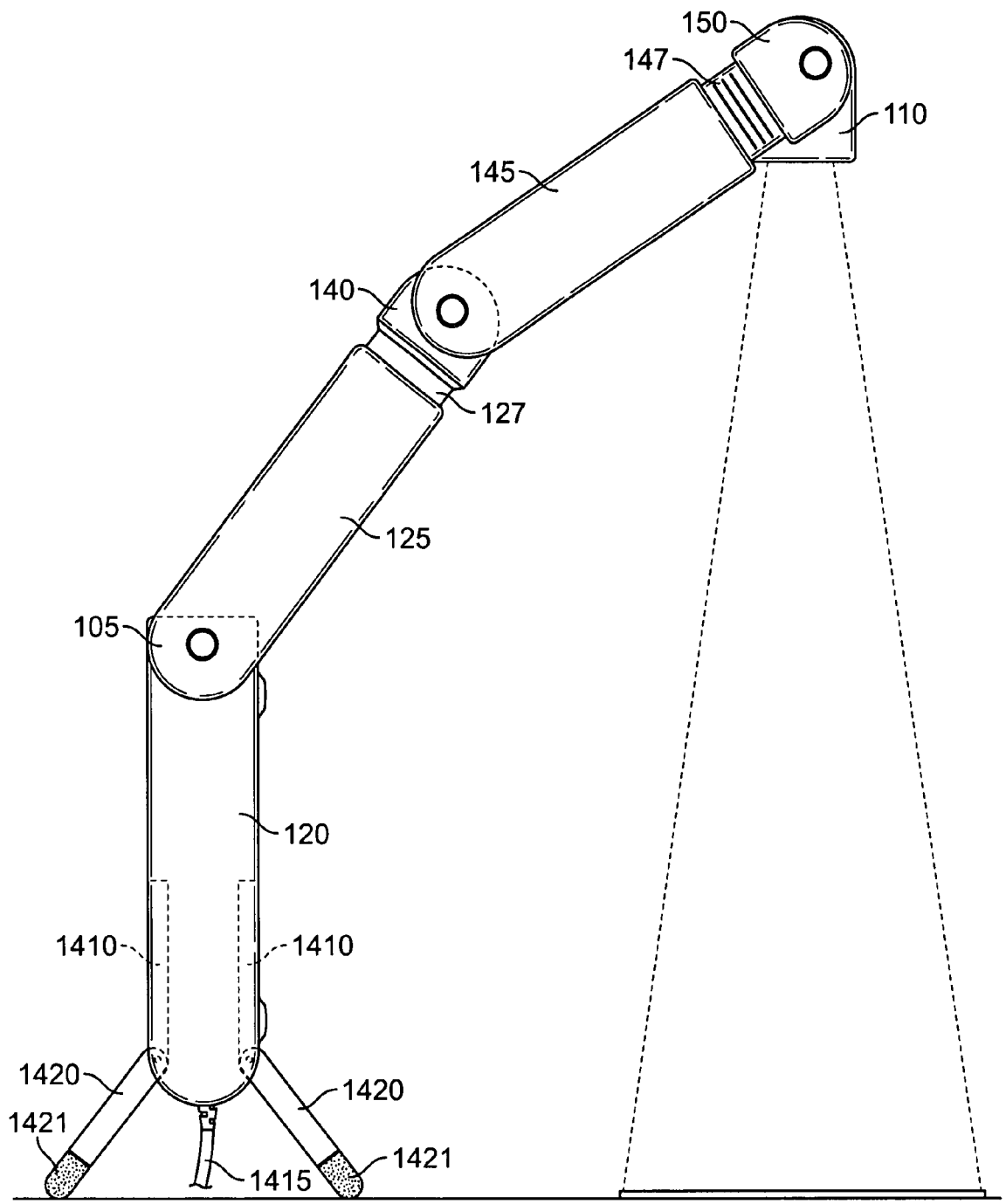
FIG. 14B illustrates a side view of the document camera of FIG. 4 placed vertically on a surface according to an embodiment of the present invention.

FIG. 14A illustrates a top perspective view of the document camera of FIG. 4 placed vertically on a surface. FIG. 14B illustrates a side view of the document camera of FIG. 4 placed vertically on a surface according to an embodiment of the present invention. In this embodiment of the invention, the document imager is placed on the face which includes the VGA video port and the power cable. As illustrated in FIGS. 14A and 14B, the portable document imager includes a pair of support plates 1420. The support plates 1420, when not extended, are placed in a cavity 1410 when the document camera is not placed in a vertical position. If the document camera is placed in the vertical position, the two support plates 1420 are rotated clockwise and counter clockwise, respectively, via two hinges 1415. In embodiments of the invention, the support plates are rotated approximately 145 degrees from its resting position. Each of the support plates 1420 includes a pair of tips 1421. There is a spacing between the pair of tips 1421 to allow either the video cable or the power cable to pass under the support plates 1420. The placement of the document camera in the vertical position places the camera head assembly 110 in a higher position and allows the camera head assembly to capture a larger viewing area. As is illustrated in FIG. 14B, the support legs 1420 are placed symmetrically on both sides of the base 120.

Figure 15:
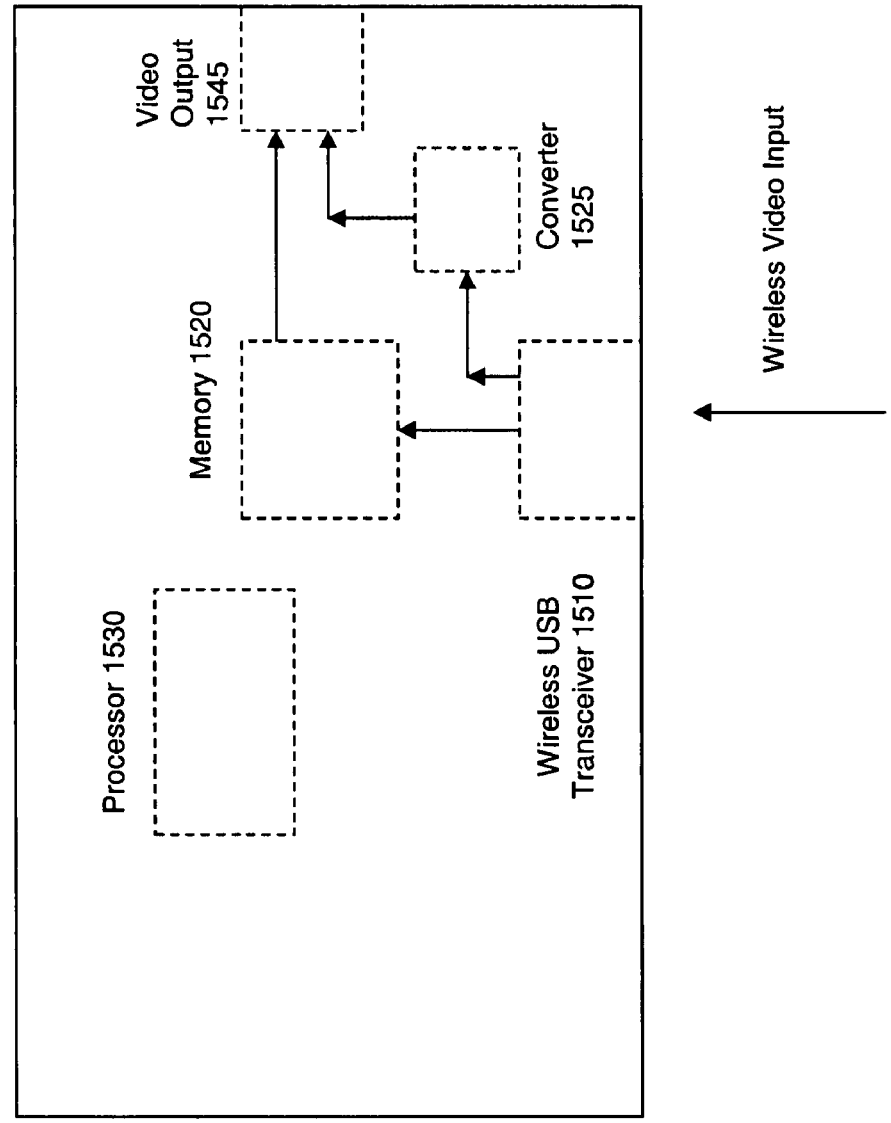
FIG. 15 illustrates a block diagram of a document camera including wireless USB video input according to an embodiment of the invention.

FIG. 15 illustrates a block diagram of a document camera including wireless USB video input according to an embodiment of the invention. The document camera 1500 includes a USB port including a wireless receiver 1510, a memory 1520, a processor 1530, a converter 1525, and a video output port 1545. Wireless video signals are transmitted from an external device and received at the USB port including the wireless receiver 1510. In an embodiment of the invention, the processor 1530 controls the wireless receiver 1510 to receiver the wireless video signal and transmit the wireless video signal to a memory 1520 where it is stored in the memory 1520 for later use by the document camera. Under certain operating conditions, the wireless video signal is converted to a format that may be stored in the memory 1520. In an embodiment of the invention, the wireless video signal is sent from the wireless receiver 1510 to a converter 1525. The transfer or transmission is controlled by the processor 1530. The converter 1525 may convert the received wireless video signal (for example, a USB format) to an output video format, e.g., the VGA video format. After the converter 1525 converts the received wireless video signal to the desired output video format, the converter 1525 transfers the formatted video signal to the output video connector 1545. From the output video connector 1545, the output video is transmitted to a display (e.g., a computer display or a projector screen).

Figure 16:
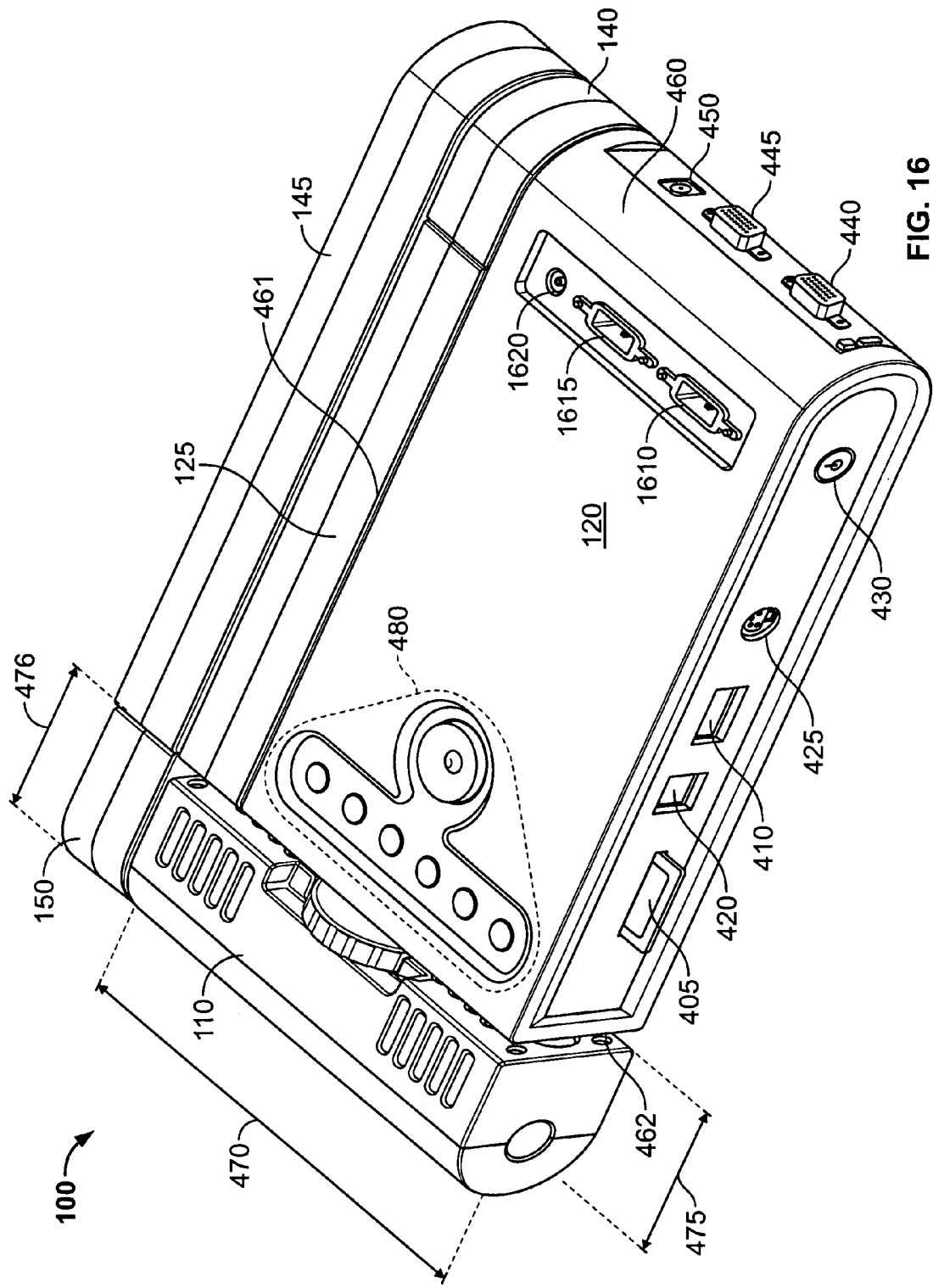
FIG. 16 illustrates a document camera including power outlets according to an embodiment of the present invention.

FIG. 16 illustrates a document camera including power outlets according to an embodiment of the present invention. A top face of the document camera may include one or more power connectors 1610, 1615, and 1620. In another embodiment of the present invention, the one or more power connectors may be installed on one of the side faces, which are perpendicular to the surface on which the document camera rests. In an embodiment of the invention, the power connectors may be DC power connectors to allow additional accessories to be connected. In an embodiment of the invention, the power connectors may be AC power connectors. If the power connectors are AC power connectors, the document camera will need a transformer and switching devices in order to create an AC voltage that can be supplied to other devices which are attached to the AC power connectors. The devices in the marketplace do not include additional power connectors on a face of the document camera. This is important because in a classroom or courtroom environment, space is at premium and eliminating unnecessary cabling and connections to power outlets is an advantage. In addition, there are a number of video or data sources that may be coupled or connected to the document camera and having a convenient power connector for these video or data sources allows for closer placement of the video or data sources to the document camera.

Figure 17:
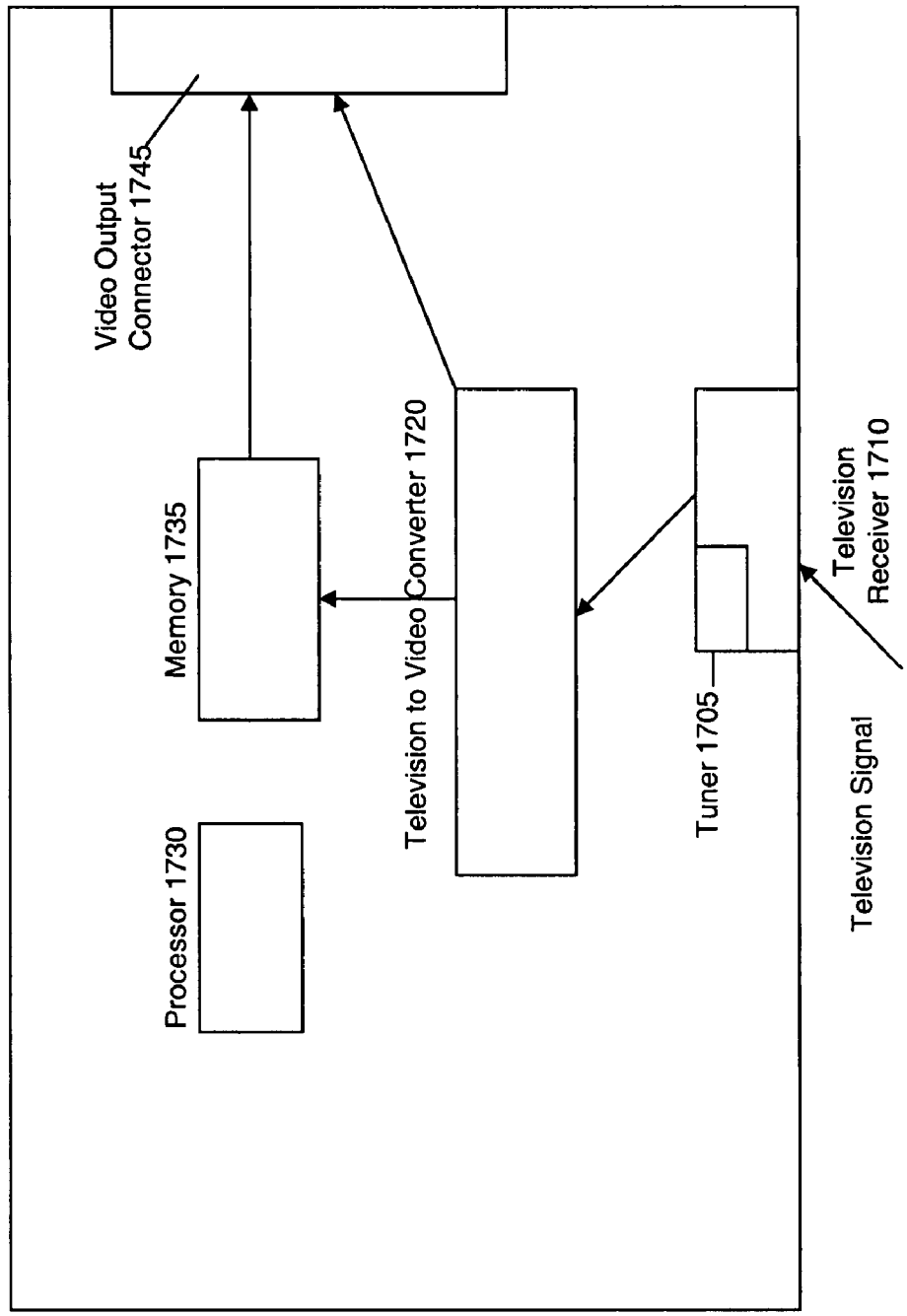
FIG. 17 illustrates a document camera including a built-in TV tuner according to an embodiment of the present invention.

FIG. 17 illustrates a document camera including a built-in TV tuner according to an embodiment of the present invention. In the embodiment of the invention, the document camera includes a television receiver 1710. The television receiver 1710 includes a tuner 1705. A channel may be selected using a menu. The tuner 1705 selects the channel. The receiver 1710 receives the transmitted television signal. After the receiver 1710 receives the television signal, the received television signal is transmitted to a television signal to video signal converter 1720 which converts the television signal to a video signal. In an embodiment of the invention, the video signal is transmitted from the television to video converter 1720 to a memory 1735. When a user selects an image(s) from the memory 1735, the image(s) are transferred from the memory 1735 out of the video output connector. A processor 1730 may control the interoperability of the receiver 1710, the tuner 1705, the television to video converter 1720 and the memory 1735. In an embodiment of the invention, the video signal is transmitted from the television to video converter 1720 to the video output 1745.

Figure 18:
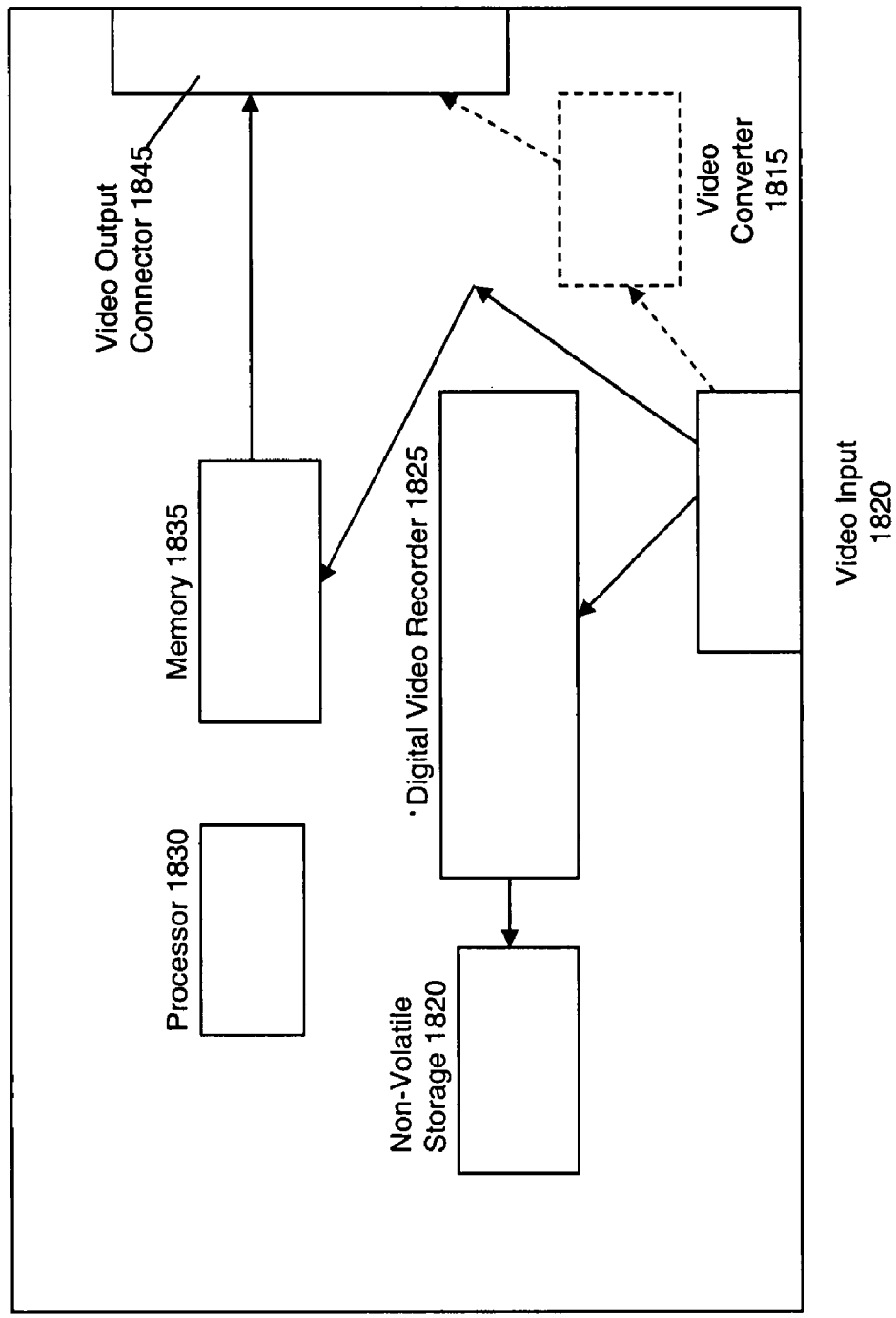
FIG. 18 includes a document camera including a digital video recorder and disk storage capacity according to an embodiment of the invention.

FIG. 18 includes a document camera including a digital video recorder and disk storage capacity according to an embodiment of the invention. A video signal is input to a video input connector 1820 of the portable document camera 1800. A digital video recorder (DVR) 1825 receives the input video from the video input connector 1820. The DVR 1825 may be controlled by the processor 1830. The DVR 1825 stores the input video in a non-volatile storage 1820, e.g., a removable hard drive, a hard drive, a high capacity memory card, a DVD, and a CD. In addition, the input video may be transferred to a video converter 1815 to convert the video to the output video format. From the video converter 1815, the converted video is transferred to the video output connector 1845. Under other operating conditions, the input video may be transferred to a memory 1835 and stored as image(s). When the image(s) are selected via the menu, the image(s) are output via the video output connector 1845. In an embodiment of the invention, the DVR may be utilized in the same document camera as a TV tuner.

Figure 19:
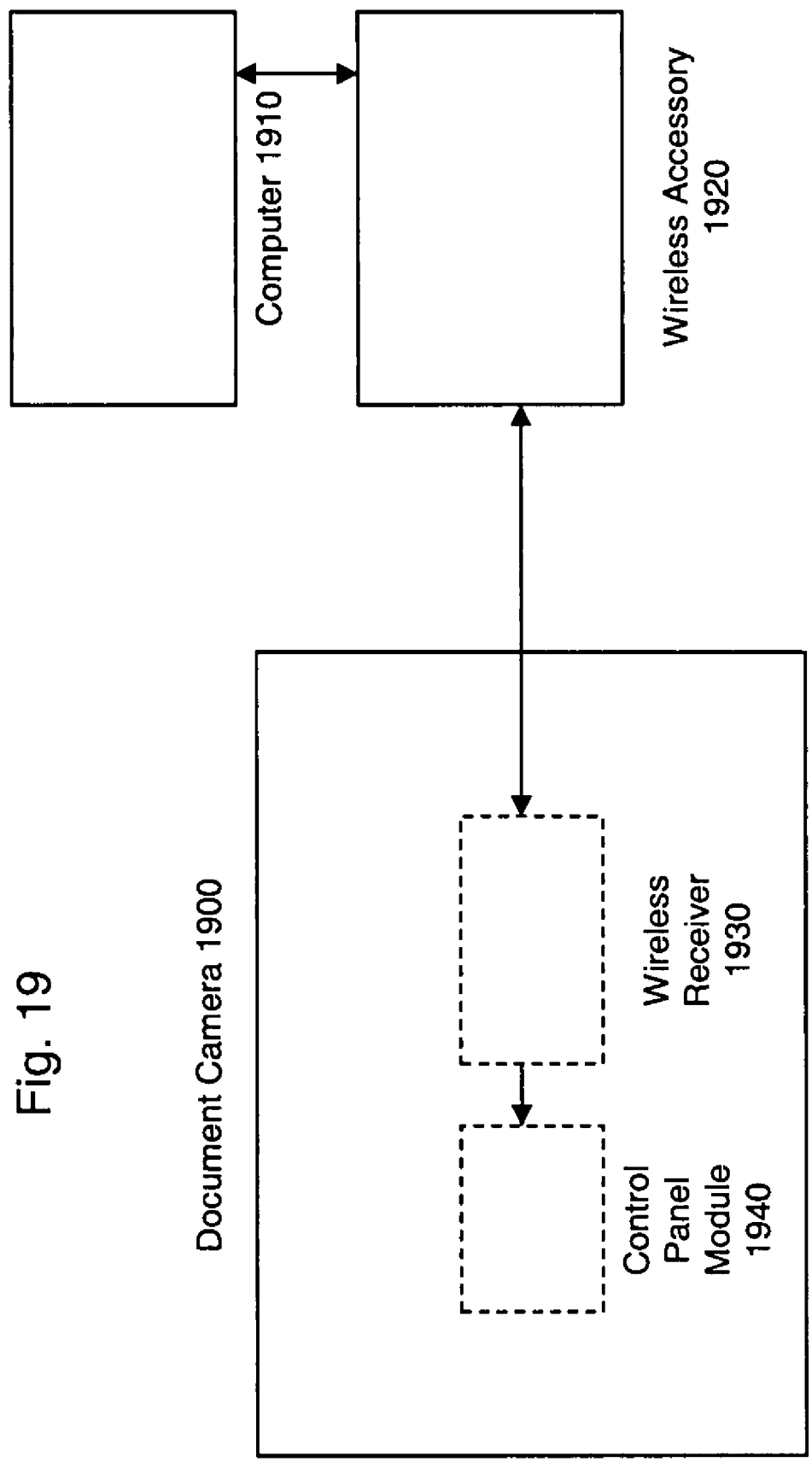
FIG. 19 includes a document camera including interfaces for wireless keyboard accessories according to an embodiment of the invention.

FIG. 19 includes a document camera including interfaces for wireless keyboard accessories according to an embodiment of the invention. The system includes a document camera 1900, a computer 1910, and a wireless accessory 1920. The wireless accessory 1920 may be a mouse, a keyboard, or a pointing device. In this embodiment of the invention, the wireless accessory 1920 may be utilized to input commands to the document camera 1900 in place of the five-way switch 481. The wireless accessory 1920 may be utilized to select menu items and commands are transmitted to a receiver in the computer 1910. In addition, a wireless receiver 1930 in document camera 1900 also receives the commands transmitted from the wireless accessory 1920. The wireless receiver 1930 transmits the received commands to the control panel module 1940. The control panel module 1940 takes the commands and performs the operations specified by the commands. Illustratively, these commands may include zoom, menu, brightness, etc.

Figure 20:
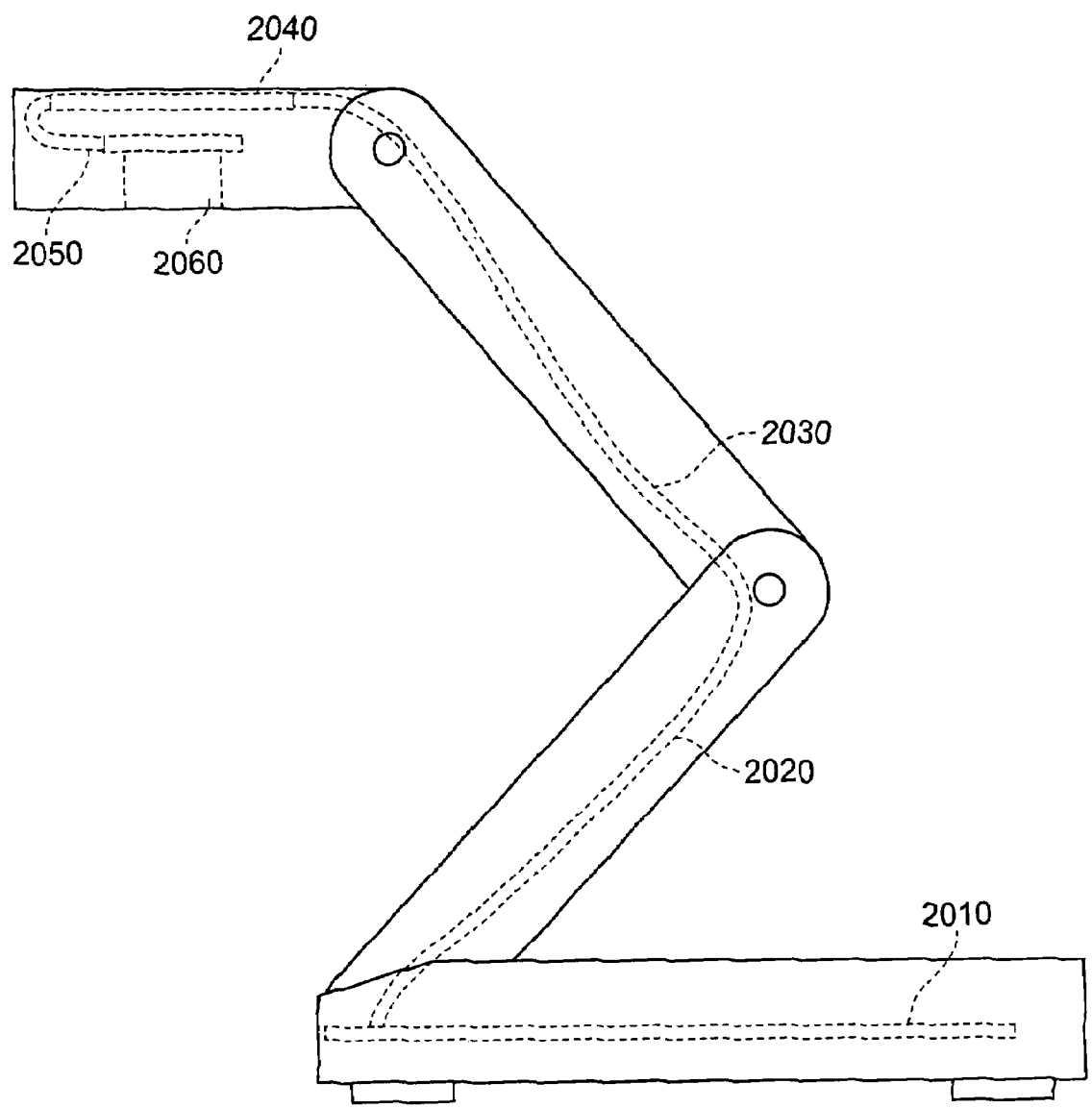
FIG. 20 illustrates a cable diagram for cabling in the document camera illustrated in FIG. 4 according to an embodiment of the invention.

FIG. 20 illustrates a cable diagram for cabling in the document camera illustrated in FIG. 4 according to an embodiment of the invention. The portable document camera 2000 includes a main printed circuit board 2010, a cable including a first portion 2020, a second portion 2030, a camera printed circuit board 2040, a second cable 2050, and the camera 2060. The main printed circuit board 2010 is connected to the first portion 2020 of the cable. The first portion 2020 of the cable is inside the first arm. The second portion 2030 of the cable is connected to the first portion 2020 is inside the second arm. The second portion 2030 of the cable is connected to the camera printed circuit board 2040. The second cable 2050 connects the camera PCB 2040 to a camera 2060. In an embodiment of the invention, a length of the cable (including the first portion 2020 and the second portion 2030) is approximately 813 millimeters. In an embodiment of the invention, a length of the second cable 2050 is approximately 100 millimeters.

Figure 21A:
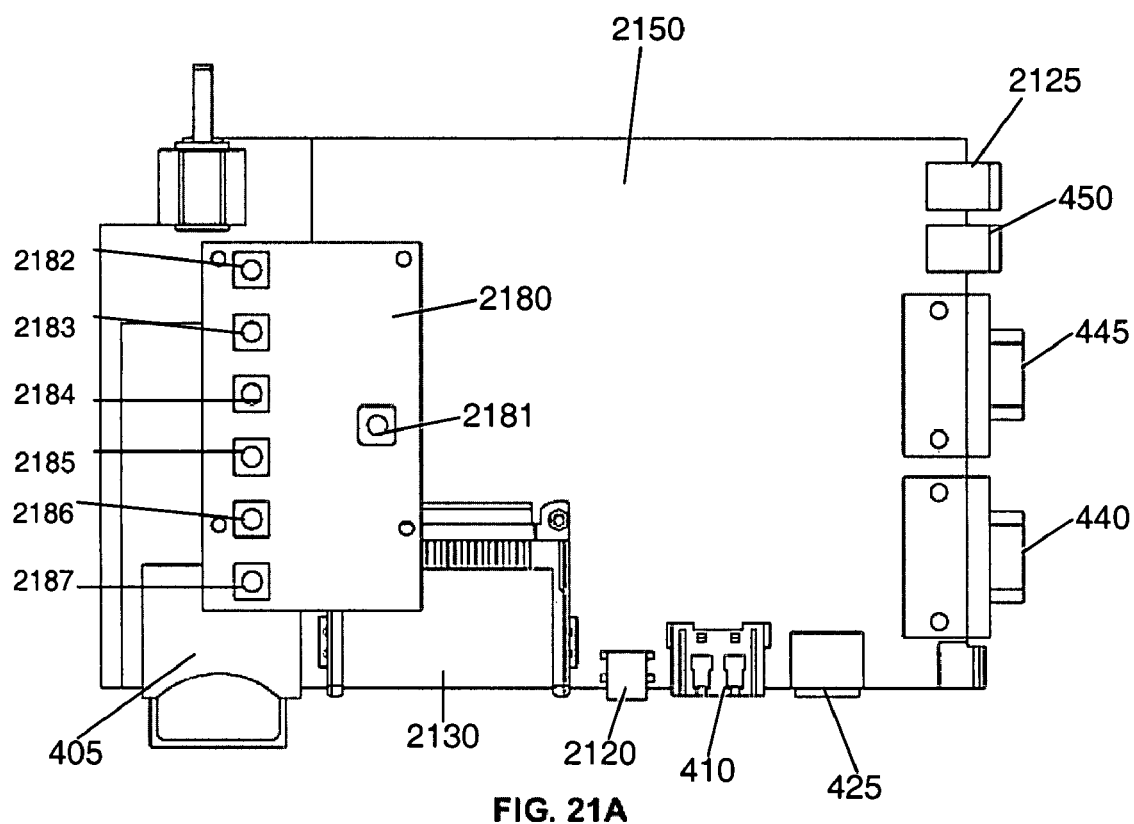
FIG. 21A illustrates a top view of circuit boards in a base according to an embodiment of the invention.
Figure 21B:
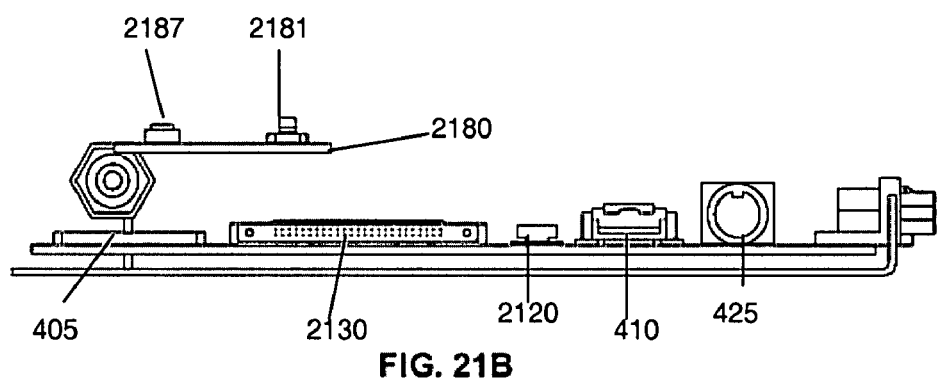
FIG. 21B illustrates a side view of circuit boards in a base according to an embodiment of the invention

FIG. 21A illustrates a top view of circuit boards in a base according to an embodiment of the invention. FIG. 21B illustrates a side view of circuit boards in a base according to an embodiment of the invention. In an embodiment of the invention, the main circuit board 2150 may include a lighting power connector 2125 for connecting to DC power. The main circuit board 2150 includes a power-connector 450, a VGA input connector 445, a VGA output connector 440. The main circuit board 2150 includes a S-video connector 425, a USB connector 410, a mini-USB connector 2120, and a memory card connector 405. In an embodiment of the invention, the main base circuit board 2150 may include a CF memory card connector 2130. A daughter circuit board 2180 is attached to the main circuit board 2150. The daughter circuit board 2180 includes a five-way actuator 2181, a focus switch 2182, a zoom switch 2183, a source switch 2184, a freeze/capture switch 2185, a print switch 2186, and a brightness switch 2187. Each of these switches by the pressing of the corresponding buttons illustrated and discussed above at FIG. 5A. Each of the switches are electrically connected to the main base circuit board 2150. These switches are electrically coupled to a processor or controller on the main base circuit board 2150.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A document camera, comprising:
   a base including control electronics;
   a first arm connected at a first end to a side of the base utilizing a first hinge;
   a second arm connected at a first end to a second end of the first arm utilizing a second hinge; and
   a camera head assembly connected at a first end to a second end of the second arm utilizing a third hinge
   wherein the camera head assembly has an maximum capture area when the first arm is rotated 90 degrees on the first hinge and is fully extended and the second arm is rotated counterclockwise between 0-45 degrees from the first arm and the maximum capture area is an 11" by 17" viewing area.

2. The document camera of claim 1, where the camera head assembly includes a lens adjuster and an imaging sensor, and movement of the lens adjuster results in changing of an orientation of the imaging sensor.

3. The document camera of claim 1, wherein the first hinge has a rotation angle of up to 90 degrees.

4. The document camera of claim 1, wherein a first side of the first arm is connected to the first side of the base and a second side of the first arm is connected to the second hinge.

5. The document camera of claim 1, wherein when the document camera is a storage position, a first side of the first arm lies next to a first side of the base, and a first side of the second arm lies next to a second side of the first arm.

6. The document camera of claim 5, wherein when the document camera is in the storage position, the camera head assembly lies next to a second side of a base.

7. The document camera of claim 1, wherein a side of the base includes a first VGA input and a VGA output.

8. The document camera of claim 7, further including a S-video output.

9. The document camera of claim 7, wherein the base includes a universal serial bus output port for printing images from the document camera utilizing Pictbridge software.

10. The document camera of claim 1, wherein the base includes a security slot for a Kensington Lock to be attached to the base.

11. The document camera of claim 1, wherein the base includes a memory card input connector.

12. The document camera of claim 1, wherein a side of the base include a memory card input connector, a USB input connector, and an S-video output connector.

13. The document camera of claim 1, wherein the first arm of the document camera is rotated approximately 90 degrees counterclockwise on the first hinge and the second arm is rotated approximately 90 degrees clockwise on the second hinge, which results in the first arm being placed at a right angle from the second arm.

14. The document camera of claim 1, wherein the first arm has a telescoping portion.

15. The document camera of claim 1, wherein the second arm has a telescoping portion.

16. The document camera of claim 1, wherein the second arm has a rotation angle of up to 180 degrees.

17. The document camera of claim 1, wherein the camera head assembly can rotate up to 180 degrees.

18. The document camera of claim 1, wherein when the document camera is a storage position, the first arm lies next to a first side of the base, the second arm lies next to the first arm and neither the first arm or the second arm rises above the height of the base when viewing the document camera from a side opposite the first side of the base where the first arm and the second arm are disposed.

19. A document camera, comprising:
a base having a first side, a second side, a third side, and a fourth side;
a first arm connected to the first side of the base via a first hinge; and
a camera head assembly coupled to the first arm,
wherein in a first position, a second side of the base rests on a horizontal surface and wherein in a second position a third side of the base rests on the horizontal surface, the second position placing the camera head assembly in a higher location with respect to the horizontal surface and allowing an imaging sensor in the camera head assembly to capture a larger viewing area.

20. The document camera of claim 19, wherein the second side of the base is perpendicular to the horizontal surface.

21. The document camera of claim 19, further comprising a second arm connected to the first arm via a second hinge, wherein the camera head assembly is connected to the second arm via a third hinge.

22. The document camera of claim 19, wherein the base further includes a pair of support legs that are placed under the base when the base is placed in the second position.

23. The document camera of claim 22, wherein the base includes recesses where the support legs rest when the base is in the first position.

24. The document camera of claim 22, wherein the plurality of support legs each include a plurality of tips.

25. The document camera of claim 24, wherein the plurality of support legs and respective tips raise the base to a height to allow one of the power cable and video cable to pass underneath the base and the other of power cable and video cable to pass between a pair of the plurality of tips.

* * * * *